United States Patent
Chen

(10) Patent No.: US 11,870,941 B2
(45) Date of Patent: Jan. 9, 2024

(54) AUDIO PROCESSING METHOD AND ELECTRONIC DEVICE

(71) Applicant: Honor Device Co., Ltd., Guangdong (CN)

(72) Inventor: Daiting Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/740,114

(22) Filed: May 9, 2022

(65) Prior Publication Data

US 2022/0272200 A1 Aug. 25, 2022

Related U.S. Application Data

(63) Continuation of application No. PCT/CN2021/119048, filed on Sep. 17, 2021.

(30) Foreign Application Priority Data

Sep. 30, 2020 (CN) .......................... 202011063396.6

(51) Int. Cl.
H04M 3/56 (2006.01)
(52) U.S. Cl.
CPC ........... H04M 3/568 (2013.01); H04M 3/566 (2013.01); H04M 3/567 (2013.01)
(58) Field of Classification Search
CPC ...... H04M 3/568; H04M 3/566; H04M 3/567; H04N 5/772; H04N 9/8211; H04N 9/8227; H04R 3/005; H04R 2420/01; H04R 2499/11; H04S 2400/15
See application file for complete search history.

(56) References Cited

U.S. PATENT DOCUMENTS

| | | |
|---|---|---|
| 9,743,033 B2 | 8/2017 | Kim et al. |
| 2012/0062729 A1 | 3/2012 | Hart et al. |
| 2015/0163587 A1* | 6/2015 | Li .......................... H04R 1/326 348/159 |
| 2018/0350405 A1 | 12/2018 | Marco et al. |

(Continued)

FOREIGN PATENT DOCUMENTS

| | | |
|---|---|---|
| CN | 104065869 A | 9/2014 |
| CN | 104699445 A | 6/2015 |

(Continued)

*Primary Examiner* — Akelaw Teshale
(74) *Attorney, Agent, or Firm* — Leydig, Voit & Mayer, Ltd.

(57) ABSTRACT

Embodiments of this application belong to the field of audio processing technologies and provide an audio processing method and an electronic device. The method is applicable to an electronic device including a camera. The electronic device records a plurality of channels of audio and video pictures corresponding to the audio in a video recording mode, and plays, during video playback, some video pictures and audio obtained after the plurality of channels of audio are combined. When a speaker in a video picture starts to speak, played audio is switched to audio corresponding to the video picture in which the speaker is located; thereby resolving a feeling of a sudden change of sound caused by switching required for obtaining audio content when the electronic device that does not support playback of a plurality of channels of audio plays a video.

18 Claims, 16 Drawing Sheets

(56) References Cited

U.S. PATENT DOCUMENTS

2021/0217433 A1    7/2021  Liu et al.
2022/0070523 A1*  3/2022  Zhao .................. H04N 21/4334

FOREIGN PATENT DOCUMENTS

| CN | 106027933 | A |   | 10/2016 |             |
|----|-----------|---|---|---------|-------------|
| CN | 110248240 | A |   | 9/2019  |             |
| CN | 110336968 | A |   | 10/2019 |             |
| CN | 107205130 | B | * | 2/2020  | H04N 5/23216 |
| CN | 110970057 | A |   | 4/2020  |             |
| CN | 111343420 | A |   | 6/2020  |             |
| JP | 2010193274 | A |  | 9/2010  |             |
| JP | 2011130469 | A |  | 6/2011  |             |
| JP | 2012120128 | A |  | 6/2012  |             |

\* cited by examiner

```
┌─────────────────────────────────────────────┐
│ Buffer an audio frame of first audio, an audio frame of │
│ second audio, and a video frame of a first video picture │──S1101
│           in a video recording mode          │
└─────────────────────────────────────────────┘
                        │
┌─────────────────────────────────────────────┐
│      Detect an action of a first speaker    │──S1102
└─────────────────────────────────────────────┘
                        │
┌─────────────────────────────────────────────┐
│ Adjust an audio feature of the first audio in third audio │
│ when it is detected that the first speaker starts to speak, │
│ and adjust an audio feature of the second audio in the │──S1103
│ third audio starting from $i$ audio frames before a current │
│  audio frame, where $i$ is greater than or equal to 1 │
└─────────────────────────────────────────────┘
```

FIG. 11

| | | | | | | |
|---|---|---|---|---|---|---|
| Track 1 | $X-i$ | $(X-i)+1$ | $(X-i)+2$ | $(X-i)+3$ | ... | X |
| Track 2 | $Y-i$ | $(Y-i)+1$ | $(Y-i)+2$ | $(Y-i)+3$ | ... | Y |
| Track 3 (Mixed track) | $M-i$ | $(M-i)+1$ | $(M-i)+2$ | $(M-i)+3$ | ... | M |
| Video frame | $Z-i$ | $(Z-i)+1$ | $(Z-i)+2$ | $(Z-i)+3$ | ... | Z |

FIG. 12

| Track 1 | X–$i$ | (X–$i$)+1 | (X–$i$)+2 | ... | X |
|---|---|---|---|---|---|
| | 11 | 12 | 200 | | |

| Track 2 | Y–$i$ | (Y–$i$)+1 | (Y–$i$)+2 | ... | Y |
|---|---|---|---|---|---|
| | 21 | 22 | 202 | | |

| Track 3 (Mixed track) | Z–$i$ | (Z–$i$)+1 | (Z–$i$)+2 | ... | Z |
|---|---|---|---|---|---|
| | 16 | 17 | 201 | | |

FIG. 13

AUDIO PROCESSING METHOD AND ELECTRONIC DEVICE

CROSS-REFERENCE TO RELATED APPLICATIONS

This application is a continuation of International Application No. PCT/CN2021/119048, filed on Sep. 17, 2021, which claims priority to Chinese Patent Application No. 202011063396.6, filed on Sep. 30, 2020. The disclosures of the aforementioned applications are hereby incorporated by reference in their entireties.

TECHNICAL FIELD

This application relates to the field of audio processing, and in particular, to an audio processing method and an electronic device.

BACKGROUND

With the increasing popularity of video sharing on social platforms, a growing number of users photograph videos by using electronic devices for sharing. During video photographing, the user may enable a multi-microphone function of the electronic device to record audio from different angles or objects, for example, voice of a speaker or a sound in an environment. Using video recording as an example, an increasing number of electronic devices have already started to support a dual-scene video recording (which includes front-facing and rear-facing dual-scene video recording and the like) function. During dual-scene video recording, there are usually two corresponding sound recording manners: One is a single-channel sound recording manner in conventional normal sound recording; and the other is a dual-channel sound recording manner. One channel of audio in the dual-channel sound recording may be recorded normally by the electronic device by using a local microphone, and the other channel of audio may be recorded by using a wireless microphone based on a microphone function of a Bluetooth headset or Audio Zoom of 3 Mic. For single-channel sound recording, only one channel of audio can be obtained, and the user cannot obtain audio corresponding different video pictures, resulting in incomplete audio content. For dual-channel sound recording, although a plurality of channels of audio corresponding to video pictures can be recorded during dual-scene video recording, during video sharing, only one of the channels of audio can be selected for sharing because a shared device may not support dual-track playback, or even if dual-track playback can be performed, because sounds of tracks interfere with each other, the user cannot obtain a good listening experience.

SUMMARY

This application provides an audio processing method and an electronic device, to adjust, based on that an event that a speaker starts to speak is detected in a photographed video image, a weight of audio corresponding to the video image in audio obtained after a plurality of channels of audio are combined, thereby resolving a feeling of a sudden change of sound caused by audio switching required for obtaining audio content when an electronic device is playing audio and video files.

According to a first aspect, an audio processing method is provided, where the electronic device includes a first camera and a second camera, the first camera performs photographing from a first viewing angle, and the second camera performs photographing from a second viewing angle, the method including:

entering a video recording mode in response to a video recording operation input by the user; in the video recording mode, recording, by the first camera, a first video picture from the first viewing angle; and recording a plurality of sound channels of audio, where the plurality of sound channels of audio include first audio corresponding to the first viewing angle and second audio corresponding to the second viewing angle; and a first speaker speaks at a first moment, and the first speaker is located in the first viewing angle;

generating a target video recording file, where the target video recording file includes third audio and the first video picture, and the third audio includes at least a part of the first audio and at least a part of the second audio; and playing the target video recording file in response to a playback operation input by the user for the target video recording file, where when a picture corresponding to the first moment is played, an audio feature of the second audio changes.

In an implementation, the first camera is a rear-facing camera, and the second camera is a front-facing camera. During video recording, the electronic device records a video picture of a rear-facing viewing angle by using the rear-facing camera; and the first speaker is within a front-facing viewing angle range. In this case, the first speaker may be, for example, a user holding the electronic device.

Alternatively, in an implementation, the first camera is a front-facing camera, and the second camera is a rear-facing camera. During video recording, the electronic device may record a video picture of a front-facing viewing angle by using the front-facing camera; and the first speaker is within a rear-facing viewing angle range. In this case, the first speaker may be, for example, a photographed object far away from the electronic device.

It should be understood that the speaker in this embodiment of this application may be a person who speaks during video recording and whose voice is recorded, for example, a user holding an electronic device; or may be a photographed object appearing in a video picture; or may be a person who does not appear in a video picture but whose voice is recorded.

In an implementation, the plurality of sound channels of audio (or referred to as a plurality of channels of audio) may be audio corresponding to different viewing angles. For example, the plurality of channels of audio respectively correspond to a plurality of photographing viewing angles.

In an implementation, during video recording, the plurality of channels of audio may be respectively acquired by a plurality of microphones simultaneously. For example, during dual-scene video recording, different audio may be acquired respectively by using a local microphone of the electronic device and a wireless microphone, and two channels of audio may respectively correspond to two photographing viewing angles. The local microphone may be a microphone installed inside the electronic device, and the wireless microphone may be a microphone establishing a wireless connection with the electronic device.

In an implementation, the target video recording file may be a video recording file, such as a file in an MP4 format, obtained after a video or audio obtained by the electronic device in the video recording mode is processed. The third audio in the target video recording file is audio obtained after the plurality of sound channels of audio are combined, and includes at least a part of the first audio and at least a part of the second audio.

In an implementation, when the plurality of sound channels of audio are combined, different weights may be set for the channels of audio. In other words, in the third audio, the channels of audio may occupy gains with different proportions. For example, when the first speaker in the second viewing angle does not speak, a weight of the second audio may be set to be relatively low, for example, 0.2 or 0.

In an implementation, when a weight of the second audio is 0, the third audio is encoded in an encoding manner of another channel of audio in the plurality of sound channels. For example, in a scenario of processing two channels of audio, when a weight of the first audio is 0, the third audio is encoded in an encoding manner of the second audio.

In an implementation, after receiving the input plurality of sound channels of audio, the electronic device may further encode each channel of audio separately.

It should be understood that to avoid a degraded listening experience of a user caused by overflow after the audio of the channels are combined, a sum of weights of the channels of audio after the third audio is adjusted should be 1.

According to the audio processing method provided in this embodiment of this application, based on an event that a speaker starts to speak is detected in a photographed video image, an audio feature of audio corresponding to the video image in third audio is adjusted, so that an effect of switching between pieces of audio can be optimized based on presentation of complete audio, to implement natural and smooth switching between the pieces of audio, and key content in a plurality of channels of audio is highlighted in a targeted manner, thereby improving a listening experience of a user.

With reference to the first aspect, in some implementations of the first aspect, the audio feature includes a volume, and the playing the target video recording file further includes: increasing the volume of the second audio when a video picture corresponding to the first moment is played.

In an implementation, during audio processing, when it is detected that a speaker starts to speak, a moment when the speaker starts to speak is used as reference, a preset time period is rolled back from the moment, and a weight of the second audio in the third audio is adjusted i audio frames in advance until a target weight is reached. For example, the adjusted target weight of the second audio is greater than a weight of another channel of audio, so that content of the second audio is presented more in the third audio.

According to the audio processing method provided in this embodiment of this application, a volume of second audio is increased when a speaker speaks, and played audio in third audio can be switched to audio corresponding to a viewing angle in which the speaker is located, so that a user clearly hears voice of the speaker.

With reference to the first aspect, in some implementations of the first aspect, when the video picture corresponding to the first moment is played, the volume of the second audio is gradually increased.

In an implementation, during playback of the target video recording file, when the first speaker starts to speak, in the currently played third audio, the volume of the second audio is gradually increased, so that played audio is gradually switched to the second audio.

Specifically, during audio processing, when it is detected that the first speaker starts to speak, a moment when the speaker starts to speak is used as a reference, a preset time period is rolled back from the moment, the weight of the second audio is dynamically increased i audio frames in advance.

According to the audio processing method provided in this embodiment of this application, a volume of second audio is gradually increased, and the volume of the second audio can be increased from low to high during playback of a video, to naturally switch to the second audio from another audio and avoid a feeling of a sudden change of sound during playback of the video.

With reference to the first aspect, in some implementations of the first aspect, in the video recording mode, the second camera records the second video picture from the second viewing angle, the electronic device displays a photographing interface, and the photographing interface includes the first video picture and the second video picture;

the target video recording file further includes the second video picture; and when the electronic device plays the target video recording file, the electronic device displays the first video picture and the second video picture.

It should be understood that during playback, the electronic device may play, for example, a picture of a front-facing viewing angle and a picture of a rear-facing viewing angle simultaneously, or may play video pictures of dual front-facing viewing angles simultaneously, or may play video pictures of dual rear-facing viewing angles simultaneously.

In the scenario, the electronic device displays a plurality of video pictures, so that the user can view video pictures of different viewing angles, and when a speaker in one viewing angle starts to speak, played audio starts to be switched to audio corresponding to the viewing angle, to achieve an audio switching effect matching video picture content.

With reference to the first aspect, in some implementations of the first aspect, the second camera records the second video picture from the second viewing angle, the electronic device displays a photographing interface, and the photographing interface does not include the second video picture.

When the electronic device plays the target video recording file, the electronic device does not display the second video picture.

It should be understood that the electronic device can acquire video pictures of different viewing angles by using a plurality of cameras, but during video recording, the electronic device can display only some video pictures. A video picture that is not displayed may be used by the electronic device for image recognition and determining whether a speaker in a viewing angle corresponding to the video picture that is not displayed speaks.

For example, when the first camera is a rear-facing camera, and the second camera is a front-facing camera, the electronic device respectively acquires a video picture corresponding to a front-facing viewing angle and a video picture corresponding to a rear-facing viewing angle by using the rear-facing camera and the front-facing camera during video recording. However, a photographing preview interface of the electronic device can display only the video picture corresponding to the rear-facing viewing angle; and/or can play only the video picture corresponding to the rear-facing viewing angle during playback of a video.

In this case, the electronic device may run the front-facing camera in the background to acquire the video picture corresponding to the front-facing viewing angle. For example, the electronic device does not transmit data of the front-facing video picture to a display. Therefore, the front-facing video picture is not displayed in the photographing preview interface during video recording. In addition, the data of the front-facing video picture is not written into the target video recording file. Therefore, the front-facing video picture is not played during playback of the video.

The electronic device determines, by using the front-facing video picture, whether a speaker in the front-facing video picture speaks. At a moment when the speaker starts to speak, a volume of the second audio in the third audio is increased, and played audio is switched to audio corresponding to the front-facing viewing angle.

According to the audio processing method provided in this embodiment of this application, during playback of a video, when only video pictures of some viewing angles are played, and a speaker within an unplayed viewing angle range starts to speak, played audio can still be switched to audio corresponding to the viewing angle in which the speaker is located, thereby ensuring that audio switching matches audio content while satisfying different video picture viewing requirements of a user.

With reference to the first aspect, in some implementations of the first aspect, in the video recording mode, the second camera records the second video picture from the second viewing angle, and the first speaker in the second video picture opens the mouth at the first moment.

It should be understood that when the first speaker opens the mouth, it may indicate that the first speaker starts to speak. Therefore, a moment when the first speaker opens the mouth may be used as a moment when the first speaker starts to speak. According to this embodiment of this application, whether a speaker starts to speak can be determined according to an image of the speaker, so that an audio feature corresponding to a viewing angle in which the speaker is located can be further changed.

With reference to the first aspect, in some implementations of the first aspect, in the video recording mode, a second speaker speaks at a second moment, and the second speaker is within the first viewing angle; and when the electronic device plays the target video recording file, when a picture corresponding to the second moment is played, an audio feature of the first audio in the third audio changes.

In an implementation, the first viewing angle is a rear-facing viewing angle, and the second speaker may be a photographed object in the rear-facing viewing angle.

During playback of the target video recording file, when the second speaker starts to speak, played audio in the third audio is switched to audio corresponding to the rear-facing viewing angle. For example, a volume of the audio corresponding to the rear-facing viewing angle is increased, to highlight voice of the second speaker.

According to the audio processing method provided in this embodiment of this application, during playback of a video, when different speakers start to speak, played audio is switched to audio corresponding to a viewing angle within which a current speaker is, so that the user can completely obtain speech content of the current speaker in time without manually switching a played track by the user, thereby improving a listening experience of the user.

With reference to the first aspect, in some implementations of the first aspect, when a picture corresponding to the second moment is played, a volume of the first audio in the third audio is gradually increased.

For example, when it is detected that the second speaker starts to speak, the volume of the first audio may be dynamically increased with time, so that the volume of the first audio can be increased from low to high during playback of a video, to naturally switch to the first audio, so that the user clearly hears a sound of the second speaker.

According to the audio processing method provided in this embodiment of this application, a volume of first audio is gradually increased, so as to naturally switch to the first audio from another audio in the third audio, thereby avoiding a feeling of a sudden change of sound during playback of a video.

With reference to the first aspect, in some implementations of the first aspect, the electronic device includes a first microphone and a second microphone; and in the video recording mode, the first microphone records the first audio, and the second microphone records the second audio; or in the video recording mode, the first microphone records the second audio, and the second microphone records the first audio.

For example, the first microphone and the second microphone may be microphone devices installed inside the electronic device and are local microphones of the electronic device.

In other words, the electronic device may record audio of different viewing angles by using a plurality of local microphones. The plurality of local microphones may be installed at different positions of the electronic device and can record audio in different viewing angle ranges.

With reference to the first aspect, in some implementations of the first aspect, the electronic device includes a first microphone, and a second microphone is in a wireless connection with the electronic device; and in the video recording mode, the first microphone records the first audio, and the second microphone records the second audio; or in the video recording mode, the first microphone records the second audio, and the second microphone records the first audio.

For example, the first microphone may be a microphone device installed inside the electronic device and is a local microphone of the electronic device; and the second microphone may be a wireless microphone, for example, various devices having a sound recording function such as a Bluetooth headset, a Bluetooth speaker, and a mobile phone of another user.

In an implementation, the electronic device may record audio corresponding to a front-facing viewing angle by using the local microphone and record audio corresponding to a rear-facing viewing angle by using the wireless microphone. The wireless microphone may be worn by, for example, a photographed object within a rear-facing viewing angle range, or the wireless microphone is placed at a position that is convenient for recording the audio of the rear-facing viewing angle.

According to the audio processing method provided in this embodiment of this application, the electronic device can be in a wireless connection with a wireless microphone, so that the electronic device can record audio at different positions by using the wireless microphone, especially audio far away from the electronic device, thereby improving flexibility of audio recording and improving quality of audio recording from different viewing angles.

With reference to the first aspect, in some implementations of the first aspect, both the first microphone and the second microphone are in a wireless connection with the electronic device; and in the video recording mode, the first microphone records the first audio, and the second microphone records the second audio; or in the video recording mode, the first microphone records the second audio, and the second microphone records the first audio.

For example, both the first microphone and the second microphone are wireless microphones and are in a wireless connection with the electronic device.

It should be understood that the wireless microphones may be flexibly arranged at different positions. Therefore, according to photographing viewing angles, the wireless microphones may be respectively arranged at positions that are convenient for recording audio corresponding to different viewing angles, thereby improving audio quality and flexibility of audio recording.

For example, when front-facing and rear-facing dual-channel video recording is performed, the first microphone may be worn by a speaker in a front-facing viewing angle, the second microphone may be worn by a speaker in a rear-facing viewing angle, and pieces of audio of different speakers are respectively recorded. In this case, even if a distance between the speaker and the electronic device changes, an audio recording effect is not affected.

With reference to the first aspect, in some implementations of the first aspect, in the video recording mode, an audio frame of the first audio, an audio frame of the second audio, and a video frame of the first video picture are buffered;

an action of the first speaker is detected; and when it is detected that the first speaker starts to speak, an audio feature of the first audio in the third audio is adjusted, and an audio feature of the second audio in the third audio is adjusted starting from i audio frames before a current audio frame, where i is greater than or equal to 1.

It should be understood that it takes a time for a process from a moment when a speaker actually starts to speak to a moment when the electronic device detects the event. As a result, an audio frame corresponding a moment when it is detected that the speaker starts to speak may be later than that corresponding to a moment when the speaker actually starts to speak. Therefore, in this embodiment of this application, to present complete audio content, audio features of channels of audio in the third audio may be adjusted starting from a frame before a current frame.

Optionally, a first audio frame may be an audio frame buffered in a buffer at a moment when it is detected that the first speaker opens the mouth.

A start moment for adjusting audio features of channels of audio may be determined based on the first audio frame, specifically including: rolling back a preset time length by using the currently buffered first audio frame as a reference, and starting to combine a plurality of channels of audio. The preset time length may be, for example, 100 ms.

Therefore, according to the audio processing method provided in this embodiment of this application, a problem that third audio cannot include complete target audio content caused by a processing delay of the electronic device can be avoided.

With reference to the first aspect, in some implementations of the first aspect, the first viewing angle and the second viewing angle are any two of a front-facing viewing angle, a wide-angle viewing angle, or a zoom viewing angle.

According to a second aspect, an audio processing method is provided, applicable to an electronic device, where the electronic device includes a first camera and a second camera, the first camera performs photographing from a first viewing angle, and the second camera performs photographing from a second viewing angle, the method including:

entering a video recording mode in response to a video recording operation input by the user; in the video recording mode, recording, by the first camera, a first video picture from the first viewing angle; and recording a plurality of sound channels of audio, where the plurality of sound channels of audio include first audio corresponding to the first viewing angle and second audio corresponding to the second viewing angle; and a first speaker speaks at a first moment, and the first speaker is located in the first viewing angle;

generating a target video recording file, where the target video recording file includes third audio and the first video picture, and the third audio includes at least a part of the first audio and at least a part of the second audio; and playing the target video recording file in response to a playback operation input by the user for the target video recording file, where when a picture corresponding to the first moment is played, an audio feature of the first audio changes.

In an implementation, the first camera is a rear-facing camera, the first viewing angle is a rear-facing viewing angle, the first video picture is a picture of the rear-facing viewing angle, and the first audio is a sound within a rear-facing viewing angle range. The first audio may include voice of the first speaker, and the first speaker is a photographed object within the rear-facing viewing angle range. The second viewing angle is a front-facing viewing angle, and the second audio is a sound within a front-facing viewing angle range.

Alternatively, the first camera may be a front-facing camera of the electronic device, the first viewing angle is a front-facing viewing angle, the first video picture is a picture of the front-facing viewing angle, and the first audio is a sound within a front-facing viewing angle range. The second viewing angle is a rear-facing viewing angle, and the second audio is a sound within a rear-facing viewing angle range.

For example, the third audio is audio obtained after the plurality of sound channels of audio are combined, and includes at least a part of the first audio and at least a part of the second audio.

According to the audio processing method provided in this embodiment of this application, based on an event that a speaker starts to speak is detected in a photographed video image, a weight of audio corresponding to the video image in third audio is dynamically adjusted, so that an effect of switching between pieces of audio can be optimized based on presentation of complete audio, to implement natural and smooth switching between the pieces of audio, and key content in a plurality of channels of audio is highlighted in a targeted manner, thereby improving a listening experience of a user.

With reference to the second aspect, in some implementations of the second aspect, the audio feature includes a volume, and the playing the target video recording file further includes:

increasing the volume of the first audio when a video picture corresponding to the first moment is played.

According to the audio processing method provided in this embodiment of this application, a volume of first audio is increased when a speaker speaks, and played audio in third audio can be switched to audio corresponding to a viewing angle in which the speaker is located, so that the user clearly hears voice of the speaker.

With reference to the second aspect, in some implementations of the second aspect, when the video picture corresponding to the first moment is played, the volume of the first audio is gradually increased.

Specifically, when it is detected that the first speaker starts to speak, a volume of the first audio may be dynamically increased with time, so that the volume of the first audio may be changed from low to high during playback of a video, to implement natural switching.

According to the audio processing method provided in this embodiment of this application, a volume of first audio is gradually increased, so as to naturally switch to the first audio from another audio in the third audio, thereby avoiding a feeling of a sudden change of sound during playback of a video.

According to a third aspect, an electronic device is provided, including: a plurality of cameras, configured to acquire video pictures;

a screen, configured to display an interface;
an audio playback component, configured to play audio;
one or more processors;
a memory; and
one or more computer programs, stored in the one or more memories, where the one or more computer programs include instructions, and the instructions, when executed by the electronic device, cause the electronic device to perform the following steps:
entering a video recording mode in response to a video recording operation input by the user; in the video recording mode, recording, by the first camera, a first video picture from the first viewing angle; and recording a plurality of sound channels of audio, where the plurality of sound channels of audio include first audio corresponding to the first viewing angle and second audio corresponding to the second viewing angle; and a first speaker speaks at a first moment, and the first speaker is located in the first viewing angle;
generating a target video recording file, where the target video recording file includes third audio and the first video picture, and the third audio includes at least a part of the first audio and at least a part of the second audio; and
playing the target video recording file in response to a playback operation input by the user for the target video recording file, where
when a picture corresponding to the first moment is played, an audio feature of the second audio changes.

With reference to the third aspect, in some implementations of the third aspect, the audio feature includes a volume, and the instructions, when executed by the electronic device, cause the electronic device to perform the following step: increasing the volume of the second audio when the video picture corresponding to the first moment is played.

With reference to the third aspect, in some implementations of the third aspect, the instructions, when executed by the electronic device, cause the electronic device to perform the following step: gradually increasing the volume of the second audio when the video picture corresponding to the first moment is played.

With reference to the third aspect, in some implementations of the third aspect, the instructions, when executed by the electronic device, cause the electronic device to perform the following step: in the video recording mode, recording, by the second camera, the second video picture from the second viewing angle, and displaying, by the electronic device, a photographing interface, where the photographing interface includes the first video picture and the second video picture;

the target video recording file further includes the second video picture; and when the electronic device plays the target video recording file, the electronic device displays the first video picture and the second video picture.

With reference to the third aspect, in some implementations of the third aspect, the instructions, when executed by the electronic device, cause the electronic device to perform the following step: in the video recording mode, recording, by the second camera, the second video picture from the second viewing angle, and displaying, by the electronic device, a photographing interface, where the photographing interface does not include the second video picture.

When the electronic device plays the target video recording file, the electronic device does not display the second video picture.

With reference to the third aspect, in some implementations of the third aspect, the instructions, when executed by the electronic device, cause the electronic device to perform the following step: in the video recording mode, recording, by the second camera, the second video picture from the second viewing angle, where the first speaker in the second video picture opens the mouth at the first moment.

With reference to the third aspect, in some implementations of the third aspect, the instructions, when executed by the electronic device, cause the electronic device to perform the following step: gradually increasing a volume of the first audio in the third audio when a picture corresponding to the second moment is played.

With reference to the third aspect, in some implementations of the third aspect, the electronic device includes a first microphone and a second microphone; and the instructions, when executed by the electronic device, cause the electronic device to perform the following step: in the video recording mode, recording, by the first microphone, the first audio, and recording, by the second microphone, the second audio; or in the video recording mode, the first microphone records the second audio, and the second microphone records the first audio.

With reference to the third aspect, in some implementations of the third aspect, the electronic device includes a first microphone, and a second microphone is in a wireless connection with the electronic device; and the instructions, when executed by the electronic device, cause the electronic device to perform the following step: in the video recording mode, recording, by the first microphone, the first audio, and recording, by the second microphone, the second audio; or in the video recording mode, the first microphone records the second audio, and the second microphone records the first audio.

With reference to the third aspect, in some implementations of the third aspect, both a first microphone and a second microphone are in a wireless connection with the electronic device; and the instructions, when executed by the electronic device, cause the electronic device to perform the following step: in the video recording mode, recording, by the first microphone, the first audio, and recording, by the second microphone, the second audio; or in the video recording mode, the first microphone records the second audio, and the second microphone records the first audio.

With reference to the third aspect, in some implementations of the third aspect, the instructions, when executed by the electronic device, cause the electronic device to perform the following steps: in the video recording mode, buffering an audio frame of the first audio, an audio frame of the second audio, and a video frame of the first video picture;

detecting an action of the first speaker; and adjusting an audio feature of the first audio in the third audio when it is detected that the first speaker starts to speak, and adjusting an audio feature of the second audio in the third audio starting from i audio frames before a current audio frame, where i is greater than or equal to 1.

According to a fourth aspect, an electronic device is provided, including: a plurality of cameras, configured to acquire video pictures; a screen, configured to display an interface; an audio playback component, configured to play audio; one or more processors; a memory; and one or more computer programs, stored in the memory, where the one or more computer programs include instructions, and the instructions, when executed by the electronic device, cause the electronic device to perform the following steps:

entering a video recording mode in response to a video recording operation input by the user; in the video recording mode, recording, by the first camera, a first video picture from the first viewing angle; and recording a plurality of sound channels of audio, where the plurality of sound channels of audio include first audio corresponding to the first viewing angle and second audio corresponding to the second viewing angle; and a first speaker speaks at a first moment, and the first speaker is located in the first viewing angle;

generating a target video recording file, where the target video recording file includes third audio and the first video picture, and the third audio includes at least a part of the first audio and at least a part of the second audio; and playing the target video recording file in response to a playback operation input by the user for the target video recording file, where when a picture corresponding to the first moment is played, an audio feature of the first audio changes.

With reference to the fourth aspect, in some implementations of the fourth aspect, the audio feature includes a volume, and the instructions, when executed by the electronic device, cause the electronic device to perform the following step: increasing the volume of the first audio when the video picture corresponding to the first moment is played.

With reference to the fourth aspect, in some implementations of the fourth aspect, the instructions, when executed by the electronic device, cause the electronic device to perform the following step: gradually increasing the volume of the first audio when the video picture corresponding to the first moment is played.

According to a fifth aspect, an audio processing system is provided, including an electronic device and at least one wireless microphone, where the electronic device is in a wireless connection with the wireless microphone, the electronic device is configured to perform the audio processing method according to any implementation in the first aspect or the second aspect, and the wireless microphone is configured to record audio and send the recorded audio to the electronic device.

According to a sixth aspect, an apparatus is provided. The apparatus is included in an electronic device, and the apparatus has a function of implementing behaviors of the electronic device in the foregoing aspects and the possible implementations in the foregoing aspects. The function may be implemented by hardware, or may be implemented by corresponding software executed by hardware. The hardware or the software includes one or more modules or units corresponding to the function, for example, a display module or unit, a detection module or unit, and a processing module or unit.

According to a seventh aspect, a computer-readable storage medium is provided, including computer instructions, where the computer instructions, when run on an electronic device, cause the electronic device to perform the audio processing method according to any implementation in the first aspect or the second aspect.

According to an eighth aspect, a computer program product is provided, where the computer program product, when run on a computer, causes the computer to perform the audio processing method according to any implementation in the first aspect or the second aspect.

According to a ninth aspect, an electronic device is provided, including a screen, a computer memory, and a camera, and configured to implement the audio processing method according to any implementation in the first aspect or the second aspect.

BRIEF DESCRIPTION OF DRAWINGS

FIG. 11 is a schematic flowchart of still another audio processing method according to an embodiment of this application;

FIG. 12 is a schematic diagram of combining a plurality of channels of audio according to an embodiment of this application; and FIG. 13 is another schematic diagram of combining a plurality of channels of audio according to an embodiment of this application.

DESCRIPTION OF EMBODIMENTS

Figure 1:
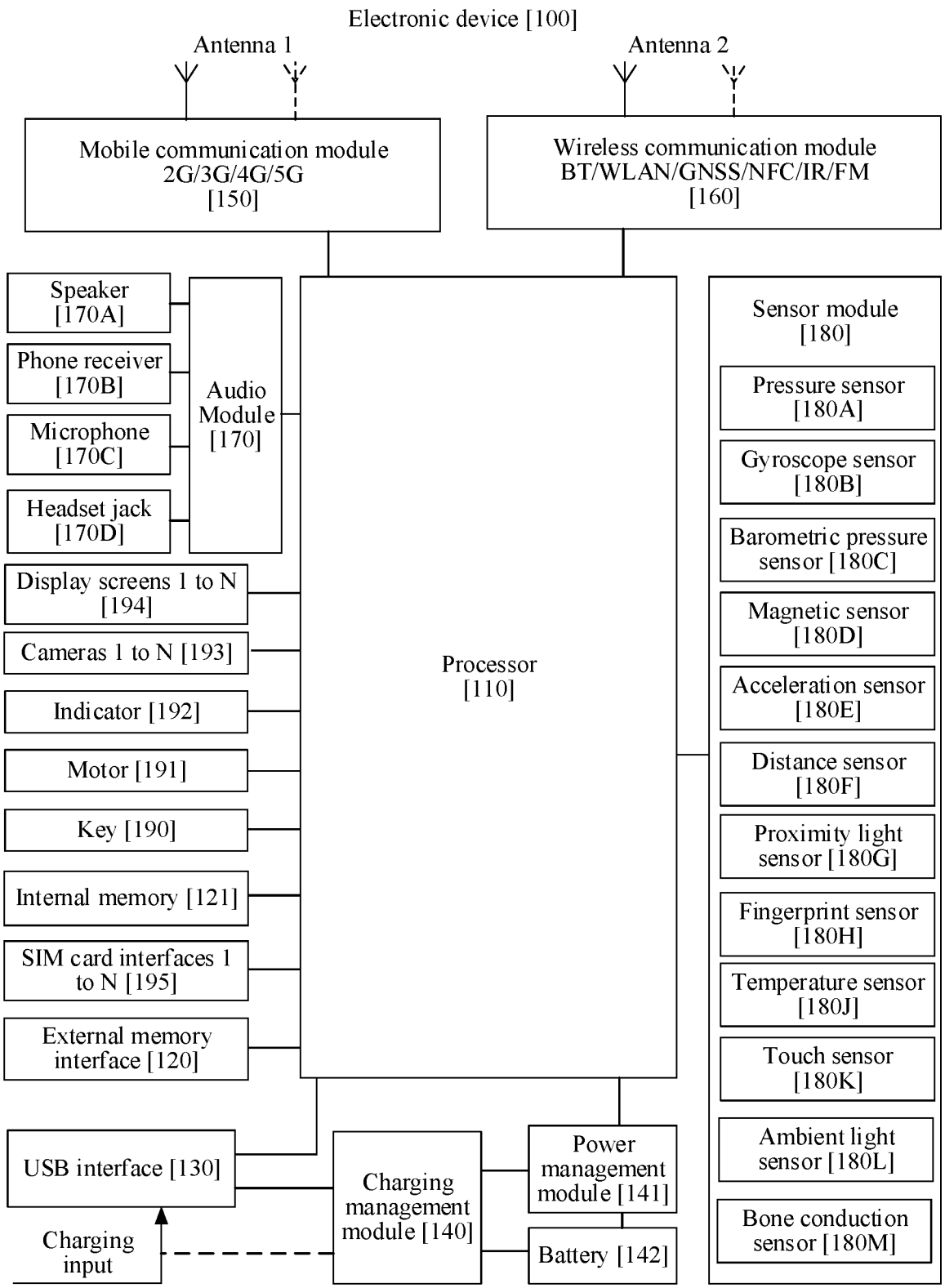
FIG. 1 is a schematic structural diagram of an electronic device according to an embodiment of this application.

The following describes the embodiments of this application with reference to the accompanying drawings in the embodiments of this application. Terms used in the implementations of the embodiments of this application are merely used to explain specific embodiments of this application, but are not intended to limit this application. In the descriptions of the embodiments of this application, unless otherwise stated, "l" represents an OR meaning, for example, A/B may represent A or B; and "and/or" in this specification is merely an association relationship for describing associated objects and represents that three relationships may exist. For example, A and/or B may represent the following three cases: only A exists, both A and B exist, and only B exists. In addition, in the descriptions of the embodiments of this application, "a plurality of" represents two or more, and "multi-channel" represents two channels or more.

The terms "first" and "second" mentioned below are merely intended for a purpose of description, and shall not be understood as an indication or implication of relative importance or implicit indication of the quantity of indicated technical features. Therefore, features defining "first" and "second" may explicitly or implicitly include one or more such features. In descriptions of embodiments of this embodiment, unless otherwise stated, "a plurality of" means two or more.

With the development of the video recording function of electronic devices, a growing number of users are accustomed to recording life or sharing fun in a video recording manner. A video recording mode may be divided into a single-channel video recording mode and a multi-channel video recording mode (or referred to as a multi-scene video recording mode) according to a quantity of channels for obtaining recorded video pictures.

In the single-channel video recording mode, an electronic device may record a single-channel video picture during video recording, that is, record a video picture of one channel. The single-channel video recording mode may be specifically divided into two cases according to different photographing viewing angles: (1) a video recording mode of which a photographing viewing angle is a front-facing photographing viewing angle (a front-facing single-channel video recording mode for short below); and (2) a video recording mode of which a photographing viewing angle is a rear-facing photographing viewing angle (a rear-facing single-channel video recording mode for short below).

In the multi-channel video recording mode, the electronic device may record multi-channel video pictures during video recording, that is, record video pictures of a plurality of channels. The video pictures of different channels may correspond to different photographing viewing angles.

The photographing viewing angle may be divided according to whether a to-be-photographed object is a front-facing object or a rear-facing object and/or a value of a zoom multiple. For example, in an embodiment of this application, the photographing viewing angle may include a front-facing viewing angle and a rear-facing viewing angle. In addition, the rear-facing viewing angle may further include a wide-angle viewing angle (or referred to as a rear-facing wide-angle viewing angle) and a zoom viewing angle (or referred to as a rear-facing zoom viewing angle) according to the value of the zoom multiple. The wide-angle viewing angle may be a photographing viewing angle corresponding to a scenario in which the zoom multiple is less than or equal to a preset value K. For example, the preset value K may be 2, 1.5, or 1. The zoom viewing angle may be a photographing viewing angle corresponding to a scenario in which the zoom multiple is greater than or equal to the preset value K. The front-facing viewing angle is a photographing viewing angle corresponding to a front-facing photographing scenario such as selfie taking.

In a possible implementation, in the multi-channel video recording mode, photographing viewing angles corresponding to channels of video pictures are fixed during the video recording. The multi-channel video recording in this case may alternatively be referred to as multi-viewing angle video recording. In this case, the multi-channel video recording mode may be further divided into the following cases according to different photographing viewing angles: (1) a video recording mode of which a photographing viewing angle includes a front-facing photographing viewing angle and a rear-facing photographing viewing angle (a front-facing and rear-facing multi-channel video recording mode for short below); (2) a video recording mode of which a photographing viewing angle includes a plurality of front-facing photographing viewing angles but does not include a rear-facing photographing viewing angle (a front-facing multi-channel video recording mode for short below); and (3) a video recording mode of which a photographing viewing angle includes a plurality of rear-facing photographing viewing angles but does not include a front-facing photographing viewing angle (a rear-facing multi-channel video recording mode for short below).

For example, a correspondence between a photographing mode and a photographing viewing angle is described by using an example in which the rear-facing photographing viewing angle is a wide-angle viewing angle and/or a zoom viewing angle. Table 1 shows a correspondence between a photographing mode and a photographing viewing angle. The photographing viewing angle corresponding to the photographing mode may be any one of a wide-angle viewing angle, a zoom viewing angle, or a front-facing viewing angle, or a combination thereof. Each photographing mode may include one or more channels, and each channel may correspond to a photographing viewing angle. Photographing modes 1 to 4 are multi-channel video recording modes, and photographing modes 5 and 6 are single-channel video recording modes. A video picture recorded by using a photographing mode in the multi-channel video recording mode may include a combination of any video pictures of a video picture in the wide-angle viewing angle, a video picture in the zoom viewing angle, or a video picture in the front-facing viewing angle.

TABLE 1

| Photographing mode | Photographing viewing angle |
| --- | --- |
| Photographing mode 1 (or referred to as a wide-angle viewing angle-zoom viewing angle combined mode) | Channel 1: wide-angle viewing angle; and Channel 2: zoom viewing angle |
| Photographing mode 2 (or referred to as a wide-angle viewing angle-front-facing viewing angle combined mode) | Channel 1: wide-angle viewing angle; and Channel 2: front-facing viewing angle |
| Photographing mode 3 (or referred to as a zoom viewing angle-front-facing viewing angle combined mode) | Channel 1: zoom viewing angle; and Channel 2: front-facing viewing angle |

TABLE 1-continued

| Photographing mode | Photographing viewing angle |
| --- | --- |
| Photographing mode 4 (or referred to as a wide-angle viewing angle-zoom viewing angle-front-facing viewing angle combined mode) | Channel 1: wide-angle viewing angle; Channel 2: zoom viewing angle; and Channel 3: front-facing viewing angle |
| Photographing mode 5 | Channel: front-facing viewing angle |
| Photographing mode 6 | Channel 1: rear-facing viewing angle (for example, a wide-angle viewing angle or a zoom viewing angle) |

In another possible implementation, in the multi-channel video recording mode, the photographing viewing angles during video recording may change in the current video recording process. For example, when it is detected that a speaker in a photographing viewing angle starts to speak, and a speaker in another photographing viewing angle does not speak, photographing may be performed only from the former viewing angle, to obtain a corresponding video picture. If it is detected that the speaker in the another viewing angle starts to speak, the viewing angle corresponding to the current speaker may be switched to for photographing, to obtain a new video picture.

For example, in the photographing mode 2 of Table 1, switching may be performed between the wide-angle viewing angle and the front-facing viewing angle. For example, there is a first speaker in the wide-angle viewing angle, and there is a second speaker in the front-facing viewing angle. It is assumed that at an initial video recording stage, the first speaker speaks and the second speaker does not speak. In this case, a video picture may be photographed only from the wide-angle viewing angle, and the electronic device displays the video picture corresponding to the wide-angle viewing angle in a photographing preview interface. Subsequently, when the first speaker stops speaking and the second speaker starts to speak, a photographing viewing angle is switched to the front-facing viewing angle, and the electronic device displays a video picture corresponding to the front-facing viewing angle in the photographing preview interface.

If the first speaker and the second speaker speak simultaneously, video pictures in two channels of the wide-angle viewing angle and the front-facing viewing angle may be photographed simultaneously. In this case, the electronic device may display the video pictures corresponding to the two viewing angles in the photographing preview interface simultaneously.

In some embodiments of this application, in the single-channel video recording mode, the electronic device may further record a plurality of channels of audio (that is, a plurality of sound channels of audio) while recording a single video picture, where the plurality of channels of audio includes pieces of audio corresponding to a plurality of video pictures respectively.

For example, in the front-facing single-channel video recording mode (for example, selfie taking of a user), the electronic device may further record audio corresponding to a front-facing viewing angle (the audio corresponding to the front-facing viewing angle for short below) while recording a video picture corresponding to the front-facing viewing angle. In addition, to obtain audio within another viewing angle range in an environment, the electronic device may further record audio corresponding to a viewing angle range other than the front-facing viewing angle range (audio of another viewing angle for short below). For example, audio corresponding to a rear-facing viewing angle is recorded. In the mode, if the front-facing video picture includes one or more speakers, the audio within the front-facing viewing angle range may be voice of the speaker or speakers; and the audio of the another viewing angle may be, for example, voice of another person in a region outside the front-facing viewing angle range or a sound in the environment.

It should be understood that the speaker in this embodiment of this application may be a person who speaks during video recording and whose voice is recorded, for example, a user holding an electronic device; or may be a photographed object appearing in a video picture; or may be a person who does not appear in a video picture but whose voice is recorded.

In another example, in the rear-facing single-channel video recording mode, the electronic device may record a video picture corresponding to a rear-facing viewing angle and audio corresponding to the rear-facing viewing angle (the audio corresponding to the rear-facing viewing angle for short below) simultaneously. In addition, the electronic device may further record audio of another viewing angle outside the rear-facing viewing angle range, for example, record audio corresponding to the front-facing viewing angle. In the mode, if the rear-facing video picture includes one or more speakers, the audio within the rear-facing viewing angle range may be voice of the speaker or speakers; and the audio of the another viewing angle may be, for example, voice of another person in a region outside the rear-facing viewing angle range or another sound in the environment.

In some other embodiments of this application, in the multi-channel video recording mode, the electronic device may further record audio corresponding to different photographing viewing angles and video pictures while recording video pictures corresponding to a plurality of photographing viewing angles respectively.

In a possible implementation, in the front-facing and rear-facing multi-channel video recording mode, the electronic device may respectively record video pictures corresponding to a front-facing viewing angle and a rear-facing viewing angle and record audio corresponding to the front-facing viewing angle and audio corresponding to the rear-facing viewing angle simultaneously. In addition, the electronic device may further record audio of another viewing angle outside the front-facing viewing angle range and the rear-facing viewing angle range. In the mode, if the front-facing video picture includes one or more speakers, the audio corresponding to the front-facing viewing angle may be voice of the speaker or speakers in the front-facing video picture; if the rear-facing video picture includes one or more speakers, the audio corresponding to the rear-facing viewing angle may be voice of the speaker or speakers in the rear-facing video picture; or the audio corresponding to the front-facing viewing angle or the audio corresponding to the rear-facing viewing angle may further include another sound in the environment or the like.

For example, in the photographing mode 4 of Table 1, audio content corresponding to the wide-angle viewing angle may include panoramic surround sounds in all directions (that is, 360° surround sounds), audio content corresponding to the zoom viewing angle mainly includes sounds within a zoom range, and audio content corresponding to the front-facing viewing angle is mainly sounds within the front-facing viewing angle range. In the photographing mode 4, the electronic device may record a video picture in the wide-angle viewing angle corresponding to the channel 1 and record audio corresponding to the channel 1 according to the wide-angle viewing angle; the electronic device may record a video picture in the zoom viewing angle corresponding to the channel 2 and record audio corresponding to the channel 2 according to the zoom viewing angle; and the electronic device may record a video picture in the front-facing viewing angle corresponding to the channel 3 and record audio corresponding to the channel 3 according to the front-facing viewing angle.

In a possible implementation, in the front-facing multi-channel video recording mode, the electronic device may record video pictures corresponding a plurality of different front-facing viewing angles and record audio corresponding to multi-channel front-facing viewing angles simultaneously. In addition, the electronic device may further record audio of another viewing angle outside the front-facing viewing angle ranges. In the mode, if the front-facing video picture includes one or more speakers, the audio corresponding to the front-facing viewing angle may be voice of the speaker or speakers; or the audio corresponding to the front-facing viewing angle may include another sound in the environment or the like.

In a possible implementation, in the rear-facing multi-channel video recording mode, the electronic device may record video pictures corresponding to a plurality of different rear-facing viewing angles, and record audio corresponding to the plurality of rear-facing viewing angles corresponding to the video pictures. In addition, the electronic device may further record audio of another viewing angle outside the rear-facing viewing angle ranges. In the mode, if the rear-facing video picture includes one or more speakers, the audio corresponding to the rear-facing viewing angles may be voice of the speaker or speakers; or the audio corresponding to the rear-facing viewing angle may further include another sound in the environment or the like.

It should be understood that in this embodiment of this application, in the video recording modes, audio and video pictures recorded by the electronic device from different viewing angles may be correspondingly that the audio is mainly audio within viewing angle ranges corresponding to the video pictures. For example, audio content of audio corresponding to a front-facing viewing angle mainly includes sounds within a front-facing viewing angle range, and audio corresponding to a rear-facing viewing angle mainly includes sounds within a rear-facing viewing angle range.

In an actual application, to obtain a better experience of recorded audio during video playback or sharing, the user is no longer satisfied with retaining only content of one channel of audio, and hopes that a recording work not only can show richer audio content, but also can achieve a natural and smooth audio switching effect. However, as described in BACKGROUND, audio of the existing video recording can only be recorded in a single-channel sound recording manner, and complete audio content cannot be retained; or even if the multi-channel sound recording described above can be performed, during video playback, to obtain content of different channels of audio, a playback track needs to be switched, causing the sound to change suddenly. In another example, during video sharing, only one channel of audio can be selected for sharing, and complete audio content cannot be provided.

To resolve the above problems, an embodiment of this application provides an audio processing method, applicable to the video recording modes described above. In the different video recording scenarios, after entering a video recording mode, the electronic device may record video pictures corresponding to different viewing angles and record a plurality of channels of audio within different viewing angle ranges simultaneously. Subsequently, the electronic device generates audio and video files including a video picture and third audio of the plurality of channels of audio. During video playback, the electronic device further plays the third audio while playing the video picture. During video playback, if a speaker starts to speak, a volume of the speaker in the third audio is gradually increased, so that the third audio is gradually switched from another sound to voice of the speaker, and voice of each speaker can be played clearly.

For example, in the front-facing single-channel video recording mode, during playback of a video (or video playback), the third audio of audio corresponding to a front-facing viewing angle and audio of another viewing angle are further played while playing a video picture corresponding to the front-facing viewing angle. For example, it is assumed that at an initial video playback stage, a speaker in a front-facing viewing angle does not start to speak, and it may be considered that in this case, voice of the speaker in the front-facing viewing angle does not need to be recorded. In this case, a volume of audio of another viewing angle (for example, audio corresponding to a rear-facing viewing angle) in the third audio is relatively high, and the audio of the another viewing angle, such as a sound in an environment or voice of another person outside a front-facing viewing angle range, is more presented, to obtain a sound that more needs to be recorded. Subsequently, when the speaker in a front-facing video picture starts to speak, a volume of audio corresponding to the front-facing viewing angle in the third audio is gradually increased, and the volume of the audio of the another viewing angle may be gradually decreased. In this case, the played audio is gradually switched to the audio corresponding to the front-facing viewing angle, and the user can hear the voice of the speaker more clearly, thereby effectively avoiding noise in another viewing angle (for example, noise in the rear-facing viewing angle). Subsequently, if the speaker stops speaking, the volume of the audio of the another viewing angle in the third audio may be gradually increased again, and the volume of the audio corresponding to the front-facing viewing angle is gradually decreased. In this case, the played audio is gradually switched to voice of another person or another sound in an environment.

In another example, in the front-facing and rear-facing multi-channel sound recording mode, during video playback, video pictures corresponding to a front-facing viewing angle and a rear-facing viewing angle respectively are played, and the electronic device further plays third audio of audio corresponding to the front-facing viewing angle and audio corresponding to the rear-facing viewing angle simultaneously. For example, it is assumed that at an initial video playback stage, a speaker in a front-facing video picture does not speak, and a speaker in a rear-facing video picture speaks, a volume of the audio corresponding to the rear-facing viewing angle in the third audio is relatively high, and a volume of the audio corresponding to the front-facing viewing angle is relatively low, or even there is no sound. Subsequently, when the speaker in the front-facing video picture starts to speak, the volume of the audio corresponding to the front-facing viewing angle in the third audio starts to be gradually increased, the volume of the audio corresponding to the rear-facing viewing angle starts to be gradually decreased, and the third audio is gradually switched from the audio corresponding to the rear-facing viewing angle to the audio corresponding to the front-facing viewing angle, so that content of the audio corresponding to the front-facing viewing angle is more presented in the third audio. Next, when the speaker in the rear-facing video picture starts to speak again, the volume of the audio corresponding to the rear-facing viewing angle in the third audio is gradually increased again, the volume of the audio corresponding to the front-facing viewing angle may be gradually decreased, and the third audio is gradually switched from the audio corresponding to the front-facing viewing angle to the audio corresponding to the rear-facing viewing angle. If the speaker in the front-facing video picture starts to speak again later, the foregoing corresponding process may be repeated for switching between the audio corresponding to the front-facing viewing angle and the audio corresponding to the rear-facing viewing angle in the third audio, so as to gradually switch the audio corresponding to the rear-facing viewing angle to the audio corresponding to the front-facing viewing angle. When the speaker in the front-facing video picture and the speaker in the rear-facing video picture speak simultaneously, voice of the speaker in the front-facing video picture and voice of the speaker in the rear-facing video picture are played.

For example, in the front-facing and rear-facing multi-channel video recording mode, during video playback, if a played video picture is a multi-channel video picture obtained by combining a wide-angle video picture and a front-facing video picture, audio played by the electronic device may be third audio of panoramic audio and the audio corresponding to the front-facing viewing angle; and if the played video picture is switched to a picture in a zoom viewing angle and a front-facing video picture, the audio played by the electronic device may be third audio of audio corresponding to a wide-angle range and the audio corresponding to the front-facing viewing angle. A switching process of each channel of audio in the third audio is similar to the switching process of each channel of audio in the front-facing and rear-facing multi-channel sound recording mode described above. Details are not described herein again.

An audio switching scenario in another video recording mode during video playback is similar to the scenario described above. For example, during video playback, when a speaker starts to speak, a volume of voice of the speaker is gradually increased, and played third audio is gradually switched to the voice of the speaker. In addition, when another speaker starts to speak, a volume of voice of the latest speaker is gradually increased, and a volume of voice of the previous speaker is gradually decreased, and the third audio is switched from the voice of the previous speaker to the voice of the current speaker, so that the user clearly hears voice of different speakers.

According to the audio processing method provided in this embodiment of this application, during video playback, the electronic device plays third audio of the plurality of channels of audio, and each channel of audio in the third audio can be switched naturally, thereby improving an audio experience of a user for video recording.

The audio processing method provided in this embodiment of this application is applicable to the electronic device. The electronic device may be specifically a mobile phone, a tablet computer, a wearable device, an in-vehicle device, an augmented reality (AR) device/a virtual reality (VR) device, a notebook computer, an ultra-mobile personal computer (UMPC), a netbook, a personal digital assistant (PDA), a dedicated camera (for example, a digital single lens reflex or a cube camera), or the like. A specific type of the electronic device is not limited in the embodiments of this application.

For example, FIG. 1 is a schematic structural diagram of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

There may be a plurality of microphones 170C, and there may also be a plurality of cameras 193 such as a front-facing camera and a rear-facing camera.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), an audio processor/digital processor, a controller, a memory, a video codec, an audio codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access, and reduce a waiting time of the processor 110, thereby improving system efficiency.

For example, in this application, a firmware program is stored in the memory and is configured to cause the controller or the processor to perform the audio processing method of this application by using an interface or a protocol.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO), a subscriber identity module interface, a universal serial bus (USB) interface, and/or the like.

The I2C interface is a bidirectional synchronous serial bus, including a serial data line (SDA) and a serial clock line (SCL). In some embodiments, the processor 110 may include a plurality of groups of I2C buses. The processor 110 may be respectively coupled to the touch sensor 180K, the microphone, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio data transmission. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may receive an audio signal by using the I2S interface, to implement an audio recording function.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset; or may receive an audio signal input by the wireless communication module 160 by using the PCM interface, to obtain audio data acquired by the wireless microphone.

The UART interface is a universal serial data bus used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using the UART interface, to implement a Bluetooth function. In some embodiments, the audio module 170 may receive an audio signal transferred by the Bluetooth module by using the UART interface, to implement a function of recording audio by using the wireless microphone in the Bluetooth headset.

The MIPI interface may be configured to connect the processor 110 to a peripheral device such as the display screen 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display screen 194 by using the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to be connected to the charger to charge the electronic device 100, or may be used for data transmission between the electronic device 100 and the peripheral device, or may be configured to be connected to a headset, to play audio by using the headset. The interface may alternatively be configured to be connected to another electronic device such as an AR device.

It should be understood that a schematic interface connection relationship between the modules in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or may be a wired charger. The power management module 141 is configured to be connected to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in the same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. The mobile communication module 150 may provide a solution to wireless communication such as 2G/3G/4G/5G applied to the electronic device 100.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. The wireless communication module 160 may provide solutions of wireless communication applied to the electronic device 100, including a wireless local area network (WLAN) (for example, a wireless fidelity (Wi-Fi) network) and Bluetooth (BT), a BeiDou navigation satellite system (BDS), a global navigation satellite system (GNSS), frequency modulation (FM), a near field communication (NFC) technology, and an infrared (IR) technology.

The electronic device 100 implements a display function by using a graphics processing unit (GPU), the display screen 194, the application processor, and the like. The GPU is a microprocessor for image processing, and is connected to the display screen 194 and the application processor. The GPU is configured to perform data and geometric calculations and is configured to render graphics. The processor 110 may include one or more GPUs and execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a quantum dot light emitting diodes (QLED), and the like. In some embodiments, the electronic device 100 may include or more display screens 194.

The electronic device 100 may implement a photographing function by using the image signal processor (ISP), the camera 193, the video codec, the GPU, the display screen 194, the application processor, and the like. In this application, the camera 193 may include a front-facing camera and a rear-facing camera of the electronic device 100 and may be an optical zoom lens or the like. This is not limited in this application.

In some embodiments, the ISP may be disposed in the camera 193. This is not limited in this application.

The camera 193 is configured to capture a static image or a video. An optical image of an object is generated through a lens and is projected to a photosensitive element. The photosensitive element may be a charge couple device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or more cameras 193.

The electronic device 100 may include a plurality of cameras 193, for example, at least one front-facing camera and rear-facing camera, a plurality of front-facing cameras, or a plurality of rear-facing cameras.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, MPEG 4, or the like.

The NPU is a neural-network (NN) computing processor, quickly processes input information by referring to a structure of a biological neural network, for example, a transmission mode between neurons in a human brain, and may further continuously perform self-learning. Applications such as intelligent cognition of the electronic device 100 may be implemented by using the NPU, for example, image recognition, facial recognition, voice recognition, and text understanding.

The external memory interface 120 may be configured to be connected to an external storage card such as a micro SD card, to expand a storage capability of the electronic device 100. The external storage card communicates with the processor 110 by using the external memory interface 120, so as to implement a data storage function, for example, storing a file such as audio or a video in the external storage card.

The internal memory 121 may be configured to store computer executable program code, and the executable program code includes an instruction. The processor 110 runs the instruction stored in the internal memory 121, to perform various function applications and data processing of the electronic device 100. The internal memory 121 may include a program storage region and a data storage region. The program storage region may store an operating system, an application required by at least one function (for example, an audio playing function or an image playing function), and the like. The data storage region may store data (for example, audio data or a telephone book) created during use of the electronic device 100. In addition, the internal memory 121 may include a high-speed random access memory, and may also include a non-volatile memory, for example, at least one magnetic disk storage device, a flash memory device, or a universal flash storage (UFS).

The electronic device 100 may implement an audio function, such as audio playback or sound recording, by using the audio module 170, the speaker 170A, the phone receiver 170B, the microphone 170C, the headset jack 170D, the application processor, and the like.

The audio module 170 is configured to convert digital audio information into an analog signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "speaker", is configured to convert an audio electrical signal into a sound signal. The electronic device 100 may enable users listen to audio, answer a call in a hands-free mode, or the like by using the speaker 170A.

The phone receiver 170B, also referred to as a "receiver", is configured to convert an audio electrical signal into a sound signal. When the electronic device 100 is used to answer a call or receive voice information, the phone receiver 170B may be put close to a human ear, to receive the voice.

The microphone 170C, also referred to as a "microphone" or a "microphone", is configured to convert a sound signal into an electrical signal. When making a call or sending voice information, a user may speak with the mouth approaching the microphone 170C, to input a sound signal to the microphone 170C. In this application, at least two microphones 170C such as a local microphone or a wireless microphone may be disposed in the electronic device 100. In some other embodiments, three, four, or more microphones 170C may be disposed in the electronic device 100, to acquire a sound signal, implement noise reduction, recognize a sound source, implement a directional sound recording function, and the like.

In this application, the electronic device may acquire a plurality of channels of audio by using a plurality of microphones 170C. In addition to the local microphone installed inside the electronic device, the electronic device may further acquire audio by using the wireless microphone in a wireless connection with the electronic device.

In this embodiment of this application, the plurality of microphones 170C may convert the obtained sound signal to an electrical signal and transfer the electrical signal to the processor 110, and after receiving the multi-channel audio signal, the audio processor in the processor 110 processes the multi-channel audio signal, for example, encode each channel of audio by using the audio codec.

The headset jack 170D is configured to be connected to a wired headset. The headset jack 170D may be a USB interface 130, or may be a 3.5 mm open mobile terminal platform (OMTP) standard interface or cellular telecommunications industry association of the USA (CTIA) standard interface.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The fingerprint sensor 180H is configured to collect a fingerprint. The electronic device 100 may implement fingerprint unlock, application lock accessing, fingerprint photographing, fingerprint-based call answering, and the like by using a feature of the collected fingerprint.

The touch sensor 180K is also referred to as a "touch panel". The touch sensor 180K may be disposed on the display screen 194. The touch sensor 180K and the display screen 194 form a touchscreen. The touch sensor 180K is configured to detect a touch operation performed on or near the touch sensor. The touch sensor may transmit the detected touch operation to the application processor, to determine a touch event type. The touch sensor may provide a visual output related to the touch operation by using the display screen 194. In some other embodiments, the touch sensor 180K may alternatively be disposed on a surface of the electronic device 100, and is located on a position different from that of the display screen 194.

Figure 2:
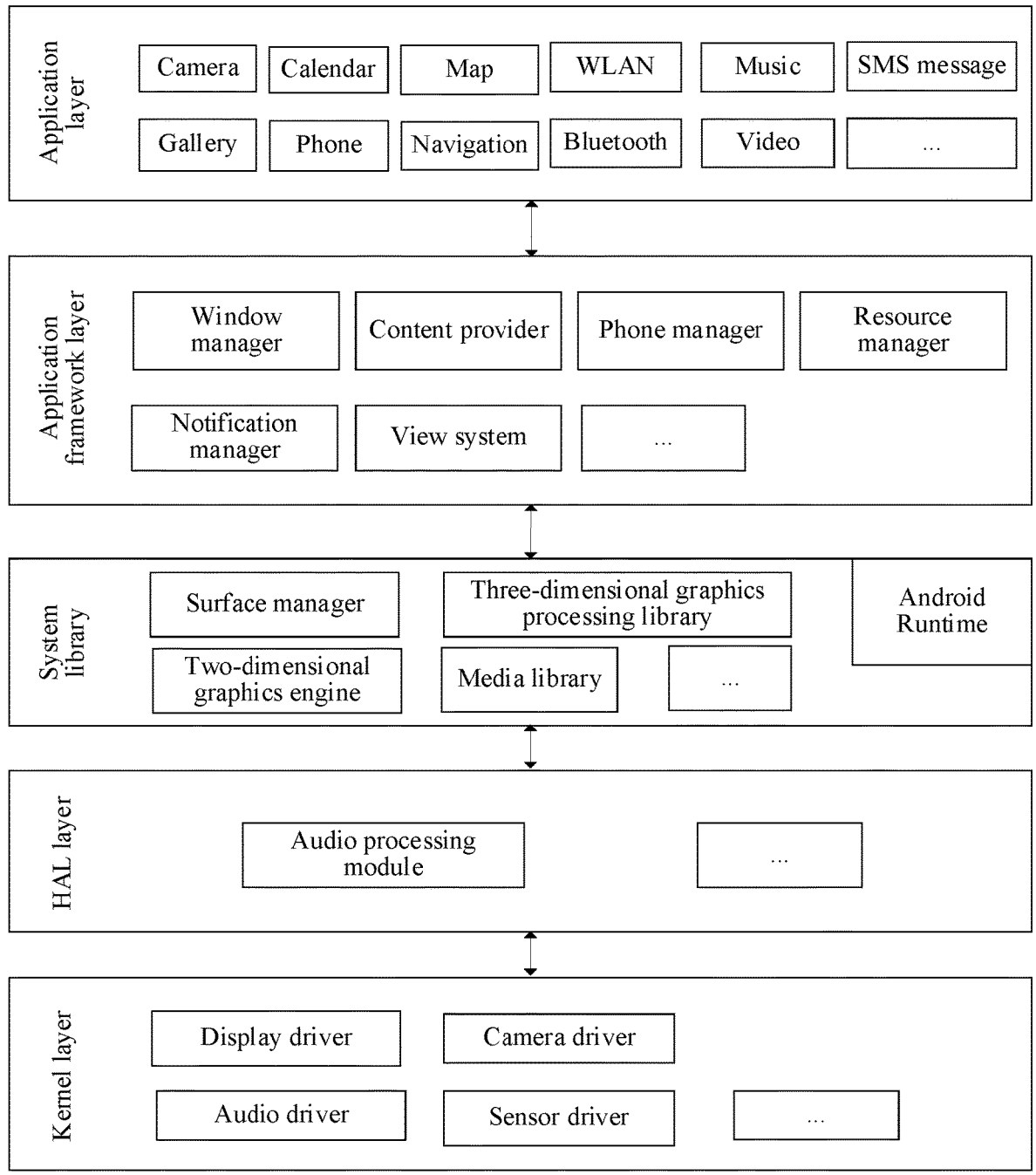
FIG. 2 is a schematic structural diagram of software of an electronic device according to an embodiment of this application.

FIG. 2 is a block diagram of a software structure of an electronic device 100 according to an embodiment of this application. In a layered architecture, software is divided into several layers, and each layer has a clear role and task. Layers communicate with each other through a software interface. In some embodiments, an Android system is divided into five layers that are respectively an application layer, an application framework layer, an Android runtime and system library, a hardware abstraction layer (HAL), and a kernel layer from top to bottom. The application layer may include a series of application packages.

As shown in FIG. 2, the application packages may include applications such as camera, gallery, calendar, phone, map, navigation, WLAN, Bluetooth, music, video, and short message.

The application framework layer provides an application programming interface (API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, audio, calls made and answered, a browsing history and bookmarks, an address book, and like.

The view system includes a visual control such as a control for text display or a control for picture display. The view system may be configured to construct an application. A display interface may be formed by one or more views. For example, a display interface including a short message notification icon may include a view for displaying a text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flash.

The Android Runtime includes a kernel library and a virtual machine. The Android runtime is responsible for scheduling and managing the Android system.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, for example, a surface manager, a media library (media libraries), a three-dimensional graphics processing library (for example, OpenGL ES), and a 2D graphics engine (for example, SGL).

The surface manager is configured to manage a display subsystem, and converge 2D and 3D layers of a plurality of applications.

The media library supports playback and recording in a plurality of common audio and video formats, and also support static image files, and the like. The media library may support a plurality of audio and video encoding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawings.

The HAL layer is an interface layer between an operating system kernel and a hardware circuit, and may be configured to abstract hardware. The HAL layer includes an audio processing module. The audio processing module may be configured to process, according to a photographing viewing angle, an analog audio electrical signal obtained by a microphone and generate audio corresponding to different photographing viewing angles and video pictures. For example, for a wide-angle viewing angle, the audio processing module may include a timbre correction module, a stereo beam forming module, a gain control module, and the like. For a zoom viewing angle, the audio processing module may include a timbre correction module, a stereo/mono beam forming module, an ambient noise control module, a gain control module, and the like. For a front-facing viewing angle, the audio processing module may include a timbre correction module, a stereo/mono beam presentation module, a voice enhancement module, a gain control module, and the like.

The kernel layer is a layer between a hardware layer and the foregoing software layer. The kernel layer includes at least a display driver, a camera driver, an audio driver, and a sensor driver. The hardware layer may include a camera, a display screen, a microphone, a processor, a memory, and the like.

In this embodiment of this application, in a video recording mode of recording a plurality of channels of audio, the display screen at the hardware layer may display a photographing preview interface during video recording, a video recording preview interface, and a photographing interface. The camera at the hardware layer may be configured to acquire multi-channel video pictures. The microphone at the hardware layer may be configured to acquire a sound signal and generate an analog audio electrical signal. The audio processing module at the HAL layer may be configured to process digital audio data converted from the analog audio electrical signal, to generate audio corresponding to different photographing viewing angles and video pictures. During video playback, the display screen may display a video playback interface, and the speaker may play a plurality of channels of audio to which the user pays attention and third audio of the plurality of channels of audio, thereby improving an audio experience of the user for multi-channel video recording.

For ease of understanding, in this embodiment of this application, a mobile phone is used as an electronic device, and a human computer interaction process during video recording is first described. For example, FIG. 3A to FIG. 3D provide schematic diagrams of graphical user interfaces (GUIs) in an audio processing procedure.

Figure 3A:
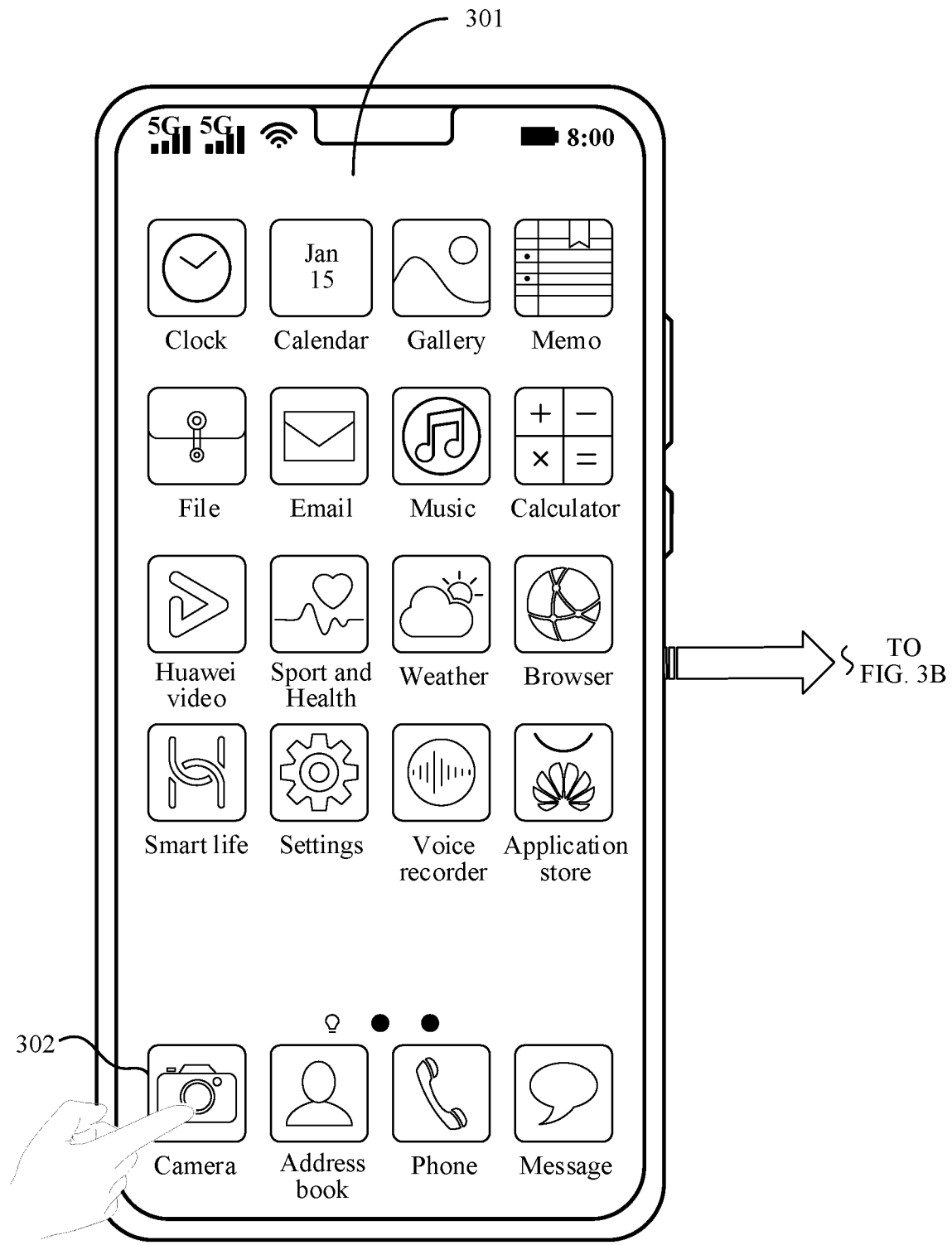
FIG. 3A to FIG. 3D are schematic diagrams of user interfaces according to an embodiment of this application.

FIG. 3A shows currently output interface content 301 displayed by a screen display system of a mobile phone in an unlocking mode of the mobile phone. The interface content 301 is a main interface of the mobile phone. The interface content 301 displays a plurality of applications (Apps) such as Gallery, Settings, Music, and Camera. It should be understood that the interface content 301 may further include other more applications. This is not limited in this application.

Figure 3B:
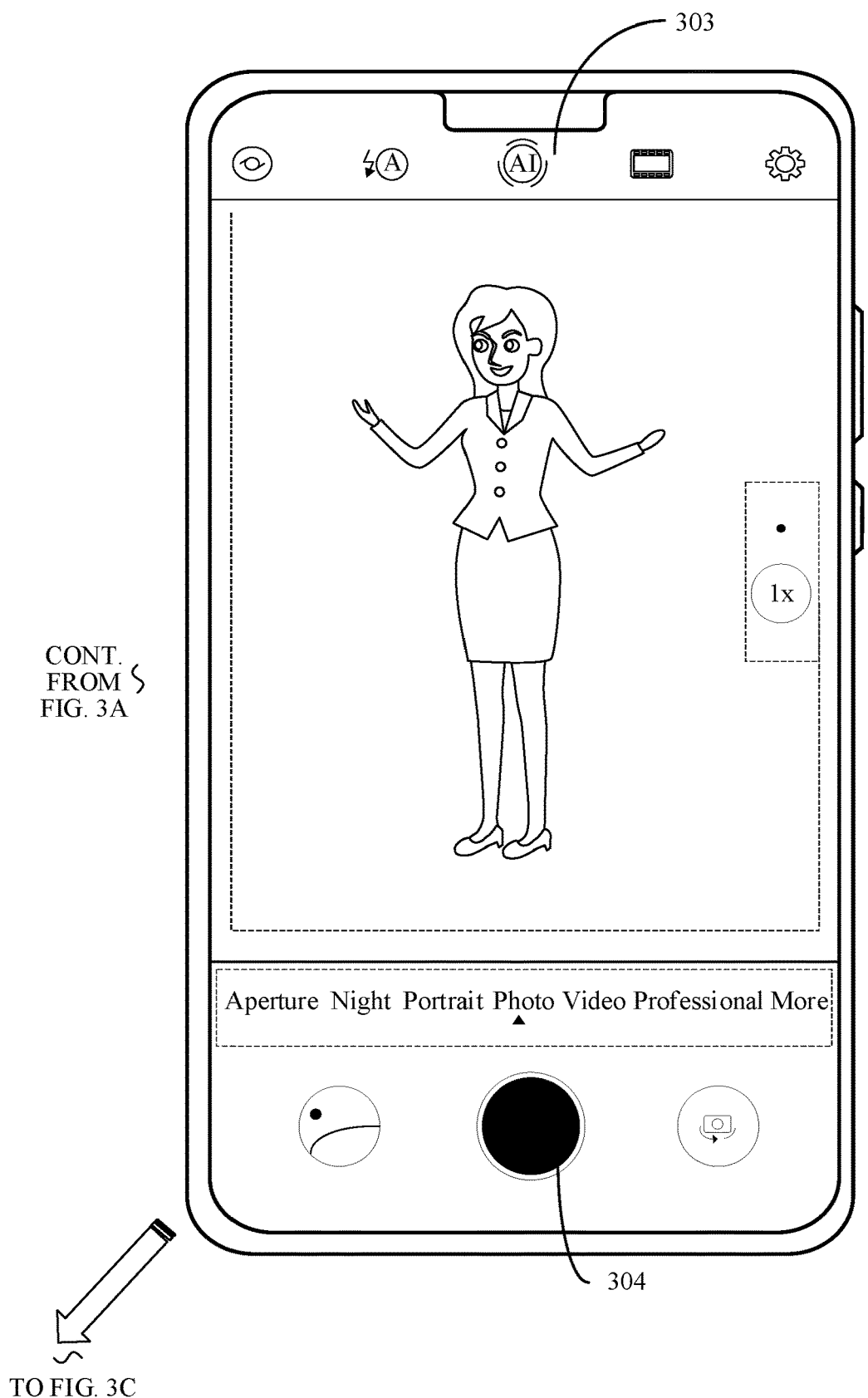

After detecting an operation that a user taps/clicks an icon 302 of a camera application on the main interface 301, the mobile phone may start the camera application, and display an interface shown in FIG. 3B. The interface may be referred to as a photographing interface 303 of the camera. The photographing interface 303 may include a viewfinder frame, an album icon, a photographing control 304, a camera rotation control, and the like.

The viewfinder frame is configured to obtain and photograph a preview image and display the preview image, such as a preview image of a person in a rear-facing viewing angle shown in FIG. 3B, in real time. The album icon is configured for quickly entering an album. After detecting that the user taps/clicks the album icon, the mobile phone may display a photographed picture, a photographed video, or the like on a touchscreen. The photographing control 304 is configured to perform photographing or video recording. After the mobile phone detects that the user taps/clicks the photographing control 304, the mobile phone performs a photo taking operation and stores a photographed picture; or when the mobile phone is in a video recording mode, after the user taps/clicks the photographing control 304, the mobile phone performs a video recording operation and stores a recorded video. The camera rotation control is configured to control switching between a front-facing camera and a rear-facing camera.

Figure 3C:
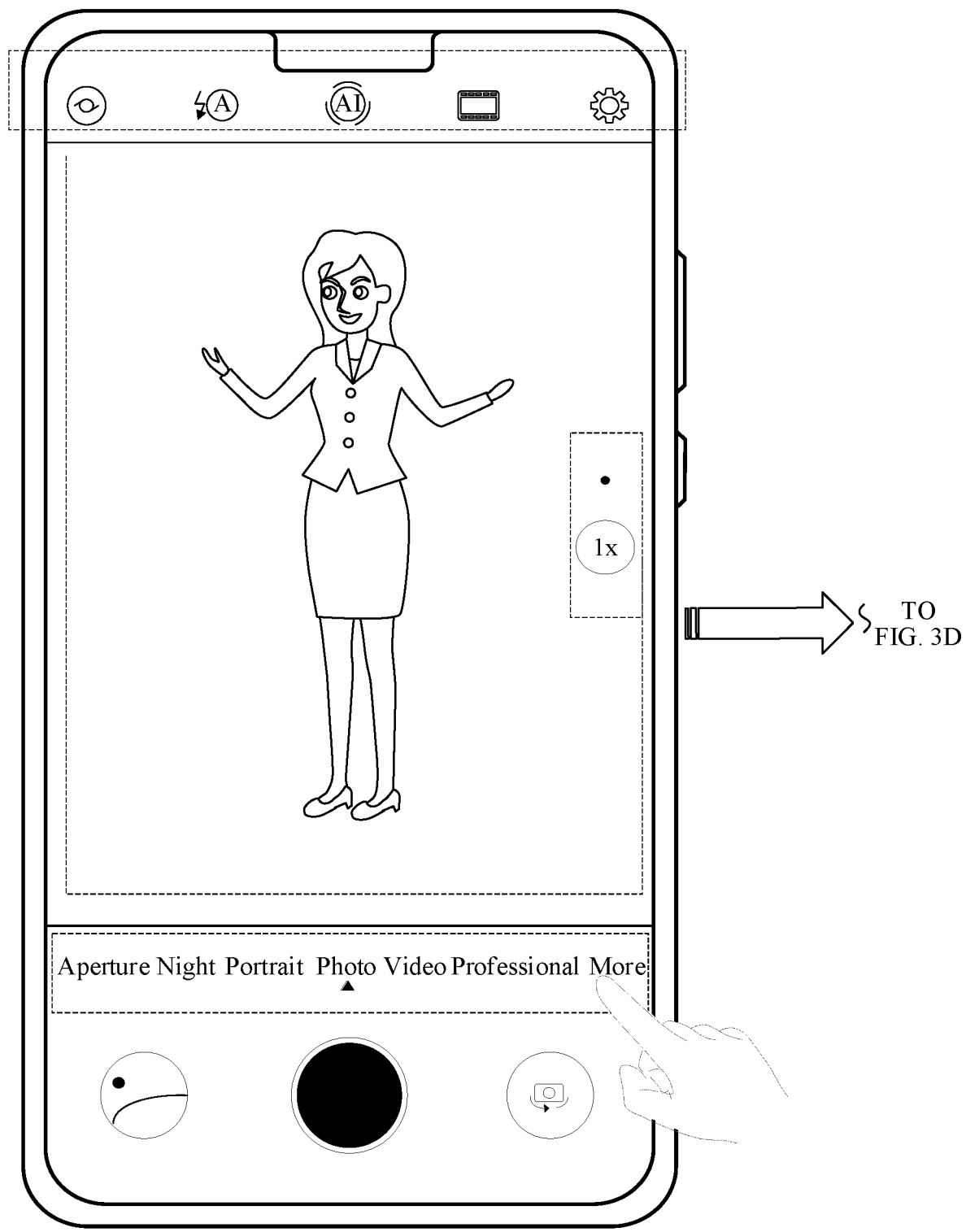

In addition, the photographing interface 303 further includes a function control configured for setting a photographing mode, for example, an aperture photographing mode, a night photographing mode, a portrait photographing mode, a photo taking mode, a video recording mode, a professional mode, and a More mode shown in FIG. 3B. As shown in FIG. 3C, the More mode may further include a slow motion mode, a panorama mode, a black-and-white art mode, a dual-scene video recording mode, a filter mode, a high-dynamic range (HDR) image mode, a multi-channel video recording mode (not shown in the figure), and the like. It should be understood that after the user taps/clicks the icon 302, in response to the tapping operation, the mobile phone is in the photo taking mode by default after opening the camera application. This is not limited in this application.

For example, when detecting that the user taps/clicks a video recording icon in the photographing interface 303 of the camera, the electronic device may enter a single-channel video recording mode, for example, enter a rear-facing single-channel video recording mode by default. When the electronic device detects that the user taps/clicks the camera rotation control, a viewing angle for video recording is switched from a rear-facing viewing angle to a front-facing viewing angle, and the video recording mode is switched to a front-facing single-channel video recording mode.

Figure 3D:
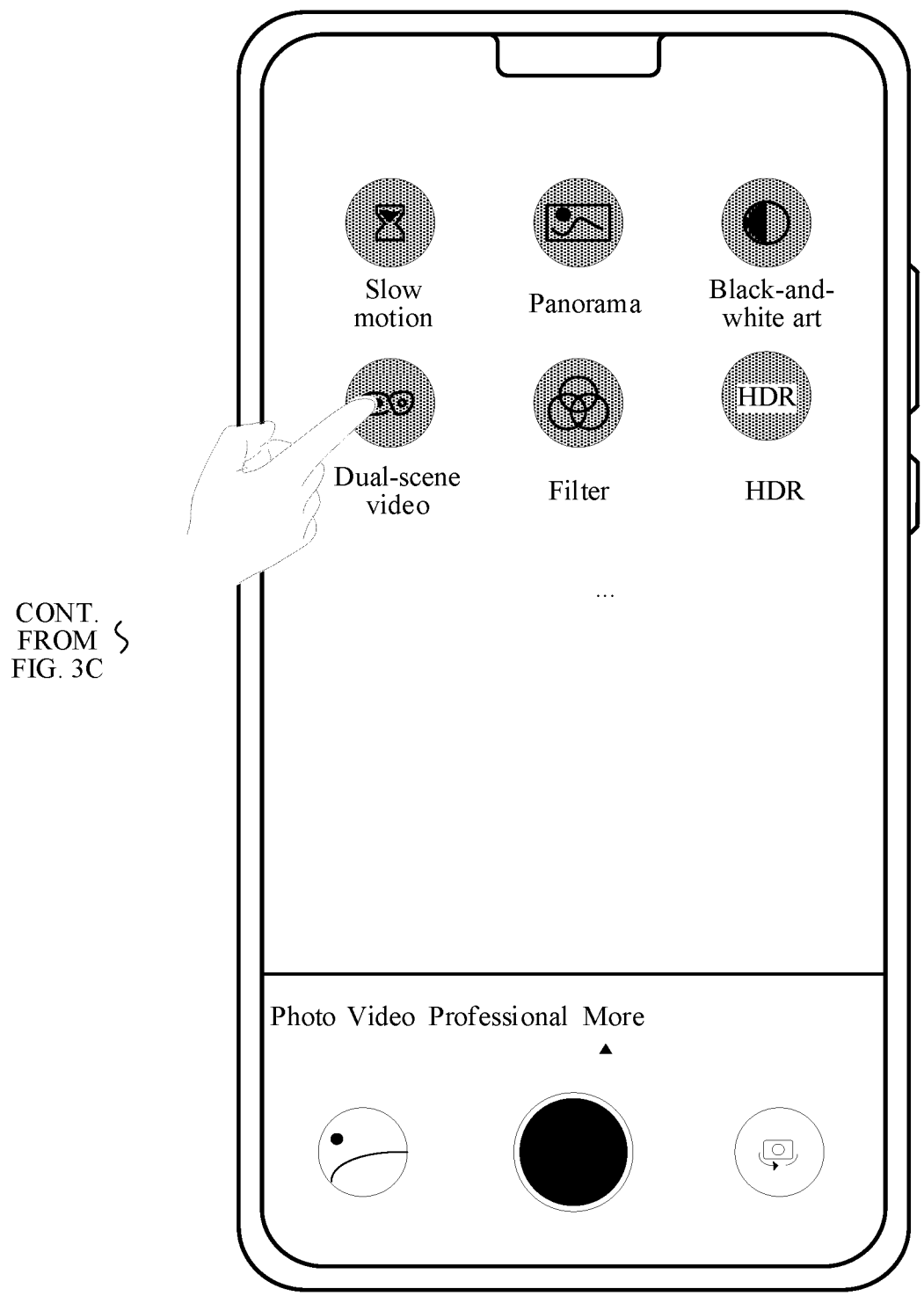

Alternatively, when detecting that the user taps/clicks a More icon in the photographing interface 303 of the camera, the electronic device displays an interface shown in FIG. 3D. The interface may be referred to as a More function interface. For example, when detecting that the user taps/clicks a dual-scene video recording icon in the More function interface, the electronic device enters a dual-scene video recording mode. For example, in the dual-scene video recording mode, a video picture of the front-facing viewing angle and a video picture of the rear-facing viewing angle (for example, a zoom viewing angle) are displayed in an image preview interface of the electronic device by default, and when the electronic device detects that the user taps/clicks the camera rotation control, the video pictures displayed in the image preview interface may be switched. For example, when it is detected that the user taps/clicks the camera rotation control once, dual-front-facing video pictures are displayed in the image preview interface, and when it is detected that the user taps/clicks the camera rotation control once again, dual-rear-facing video pictures are displayed in the image preview interface.

Figure 4A:
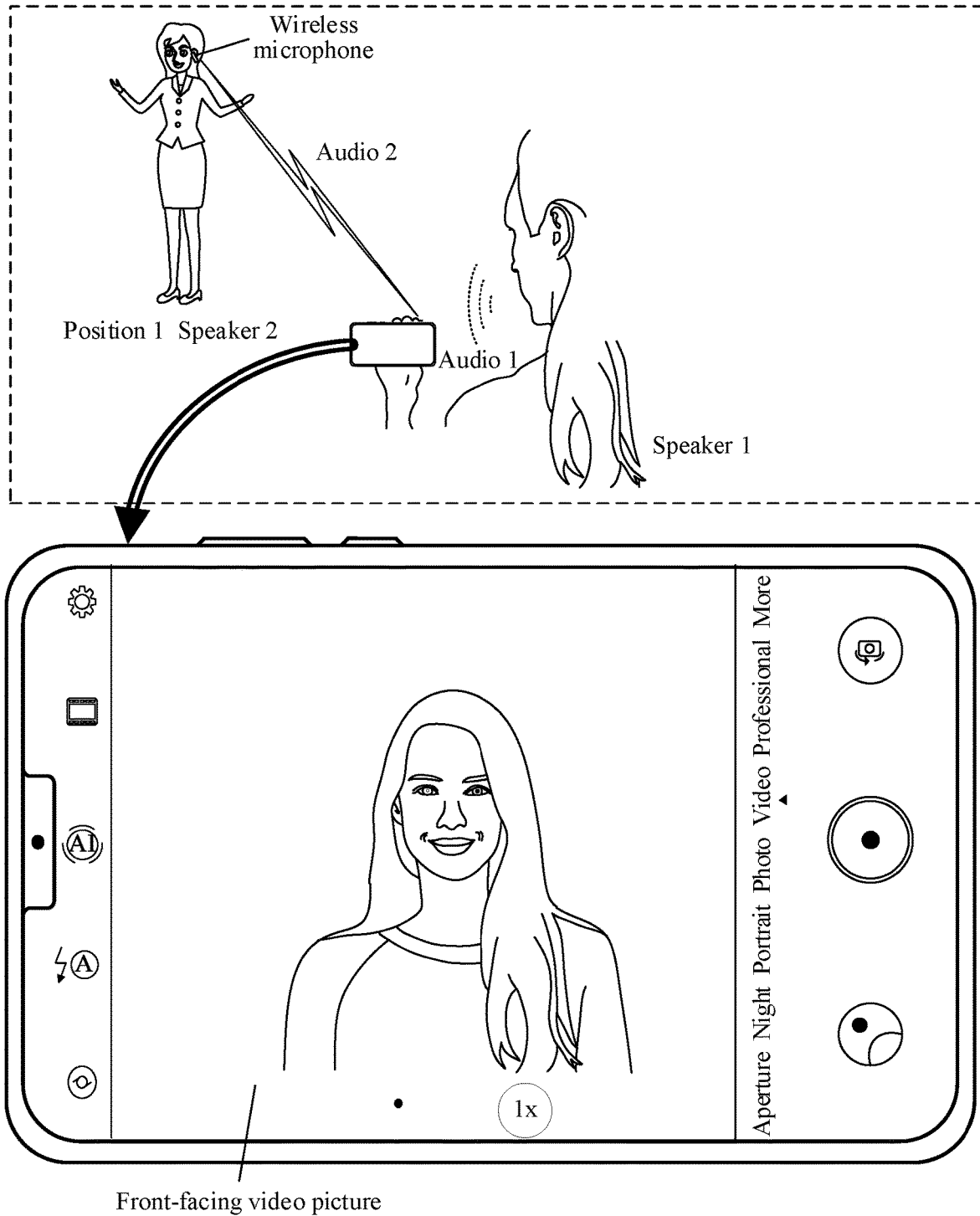
FIG. 4A to FIG. 4C are schematic diagrams of some possible application scenarios of an audio processing method according to an embodiment of this application.
Figure 4B:
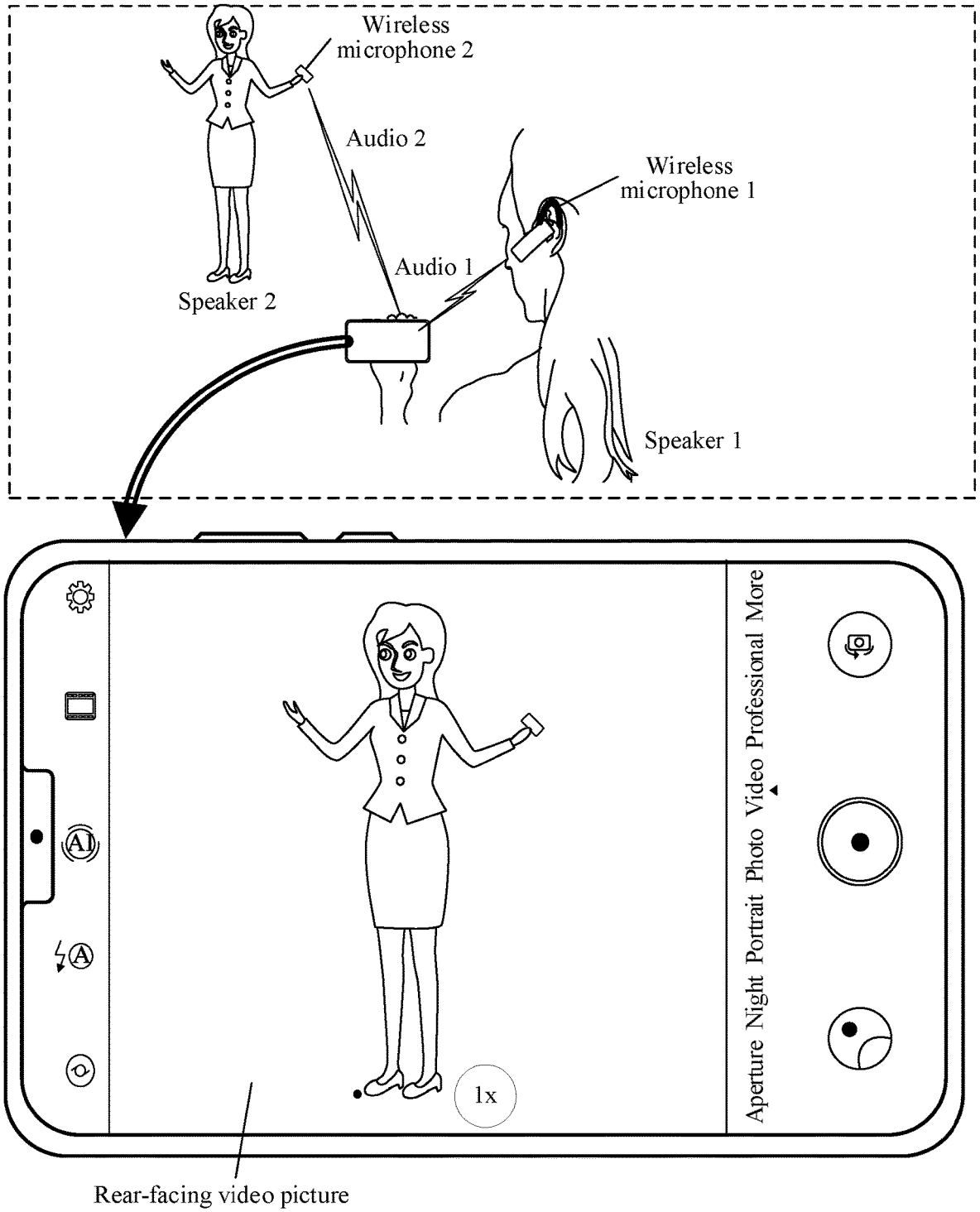
Figure 4C:
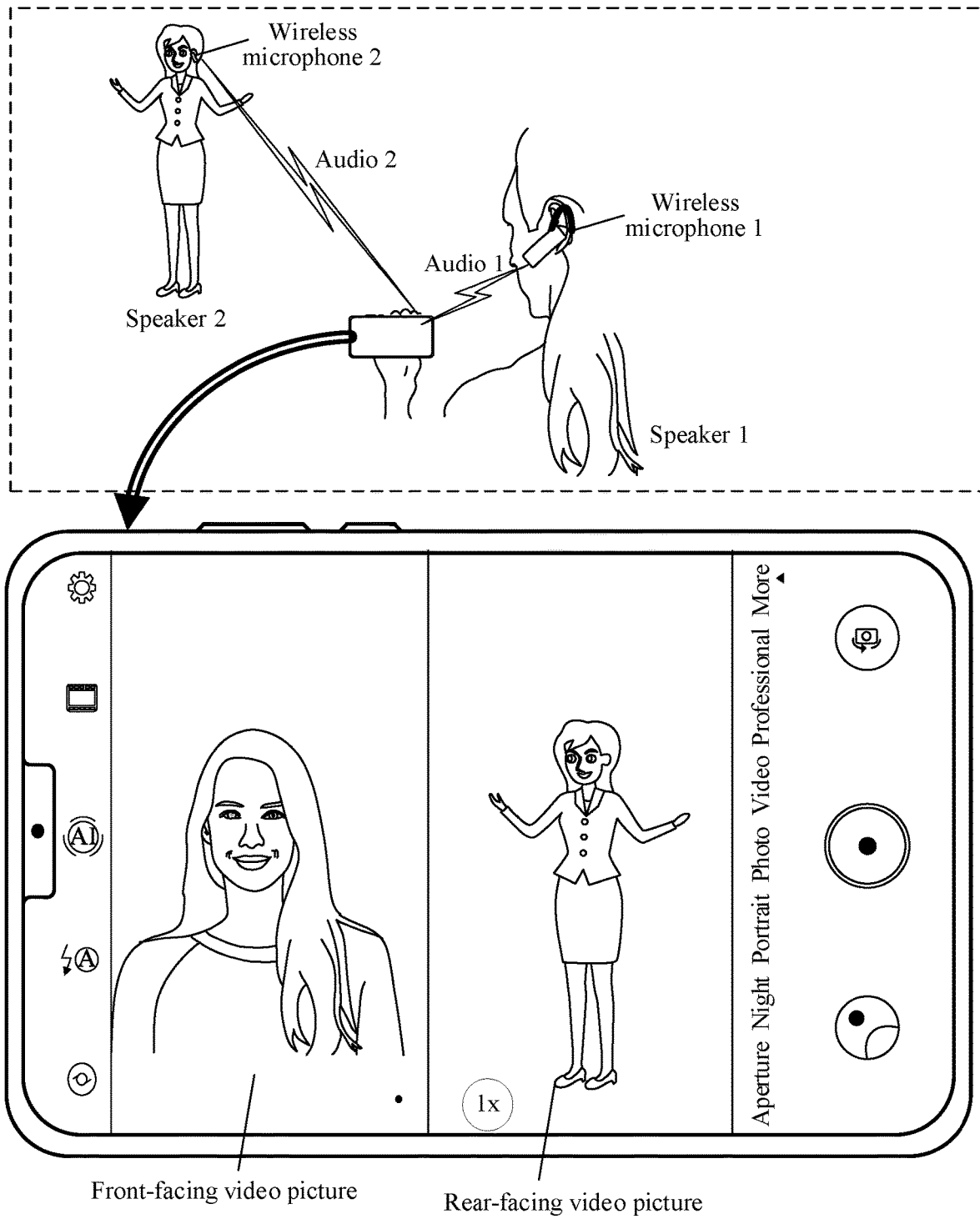

For ease of understanding, a process of recording a plurality of channels of audio during video recording is described with reference to the accompanying drawings. FIG. 4A to FIG. 4C are schematic diagrams of some video recording scenarios. In FIG. 4A, a speaker 1 is a first speaker, a speaker 2 is a second speaker, audio 2 is first audio, and audio 1 is second audio. Alternatively, a speaker 1 is a second speaker, a speaker 2 is a first speaker, audio 1 is first audio, and audio 2 is second audio. Alternatively, a speaker 1 is a first speaker, a speaker 2 is a second speaker, audio 1 is first audio, and audio 2 is second audio.

It should be understood that a plurality of channels of audio may be recorded by using a plurality of microphones. In an embodiment, the electronic device includes a plurality of microphones (the microphone of the electronic device may be referred to as a local microphone), and the plurality of local microphones may be disposed at different positions of the electronic device, to record audio in different viewing angles. In an embodiment, the electronic device may be in a wireless connection with at least one wireless microphone, the electronic device may record audio of one viewing angle by using audio acquired by one wireless microphone, and the electronic device may further record audio of a plurality of viewing angles respectively by using audio acquired by a plurality of wireless microphones. The wireless microphone may be, for example, a wireless headset, a wireless speaker, a tablet computer, a wearable device, or a mobile phone of another user having a sound recording function. Audio is recorded by using audio acquired by the wireless microphone, and voice of a speaker in a photographing viewing angle can be acquired more clearly.

It can be learned with reference to the foregoing description that the video recording mode in this embodiment of this application may be divided into the following modes according to different photographing viewing angles during video recording and different quantities of video recording channels: a front-facing single-channel video recording mode, a rear-facing single-channel video recording mode, a front-facing and rear-facing multi-channel video recording mode, a front-facing multi-channel video recording mode, and a rear-facing multi-channel video recording mode.

Video recording in this embodiment of this application may be divided into an outdoor video recording and indoor video recording according to different video recording sites.

According to different types (or referred to as sound recording types) of microphones for acquiring audio, video recording in this embodiment of this application may be divided into a case in which a plurality of local microphones participate in sound recording and a wireless microphone does not participate in the sound recording; a case in which a plurality of wireless microphones participate in sound recording, and a local microphone does not participate in the sound recording; and a case in which a local microphone and a wireless microphone jointly participate in sound recording.

In different video recording mode and video recording sites, the electronic device may record a plurality of channels of audio by using audio acquired by at least one local microphone and/or at least one wireless microphone. The plurality of channels of audio include at least sounds within photographing viewing angle ranges.

The audio processing method provided in this embodiment of this application is applicable to a plurality of combined scenarios of the video recording sites, the video recording modes, and the sound recording types. The following describes a video recording process involved in the audio processing method provided by this embodiment of this application with reference to some of the combined scenarios.

In an implementation, the electronic device may establish a wireless connection with a wireless microphone in advance. For example, after the electronic device enters a video recording mode according to related steps shown in FIG. 3A to FIG. 3D, in response to a mode change of the electronic device, the electronic device may display a prompt message to prompt a user to use which microphones for sound recording and prompt the user whether to require a wireless microphone to participate in current video recording. The user may tap/click a confirm or cancel key according to a requirement. When detecting that the user taps/clicks the cancel key, the electronic device may start a plurality of local microphones to record a plurality of channels of audio. After detecting that the user taps/clicks the confirm key, the electronic device may continue to prompt the user to select which wireless microphone for sound recording, so that the user makes a selection from available wireless microphones, and the electronic device may further prompt the user whether to further require the local microphone to participate in sound recording. When the electronic device detects that the user chooses to not require the local microphone to participate in sound recording, the plurality of wireless microphones perform recording during video recording. When the electronic device detects that the user chooses to require the local microphone to participate in sound recording, the local microphone and the wireless microphone jointly participate in sound recording during video recording. The wireless microphone may record sounds within a sound pickup range of the wireless microphone during video recording.

It should be understood that a process in which the electronic device selects a type of a microphone is merely an example, and the process may be further implemented in a plurality of other manners. For example, the electronic device may first prompt the user whether to require the local microphone to participate in sound recording, and after detecting a selection input by the user, the electronic device prompts the user again whether to require the wireless microphone to participate in sound recording and prompts the user to select which microphone or microphones for participating in sound recording. This is not limited in this application.

In an example, FIG. 4A is a schematic diagram of a sound recording scenario. The scenario may be a case in which in an outdoor site, the electronic device records, in the front-facing single-channel video recording mode, a plurality of channels of audio by using the local microphone and the wireless microphone.

In this case, after the electronic device enters a front-facing single-channel video recording mode, as shown in FIG. 4A, the electronic device records an image of a speaker 1 located in a front-facing viewing angle by using a front-facing camera, and a front-facing video picture is displayed in a photographing preview interface of the electronic device. In addition, during video recording, the local microphone of the electronic device records voice (which is denoted as audio 1) of the speaker 1, the wireless microphone (which may be a microphone on a device such as a wireless headset or a mobile phone of a speaker 2) at a position 1 records a sound within a sound pickup range of the wireless microphone, for example, voice (which is denoted as audio 2) of the speaker 2. The audio 1 and the audio 2 may be in a buffer of the electronic device.

It should be understood that in a scenario shown in FIG. 4A, the position 1 may be outside a front-facing viewing angle range, for example, the position 1 is in a rear-facing viewing angle. However, in some other implementations, the position 1 may alternatively be within a front-facing viewing angle range. When the position 1 is within the front-facing viewing angle range, the front-facing video picture displayed in the photographing preview interface may further include an image of the speaker 2.

During video recording or after video recording is completed, the wireless microphone may send the audio 2 to the electronic device through a wireless connection.

When the user taps/clicks a control for ending video recording, the electronic device ends video recording in response to a tap/click operation of the user and exits the video recording mode. The electronic device packs audio and a video to generate a video recording file. The video recording file includes the front-facing video picture and third audio, and the third audio includes at least a part of the audio 1 and at least a part of the audio 2. For example, the audio 1 and the audio 2 are recorded all the time, the third audio includes a part of the audio 1 and a part of the audio 2, and the third audio is formed by combining the part of the audio 1 and the part of the audio 2, and is formed by combining the audio 1 and the audio 2 according to specified weights in a process of switching between the audio 1 and the audio 2. In another example, the audio 1 is recorded only when the speaker 1 speaks, the audio 2 is recorded only when the speaker 2 speaks, the third audio includes all the audio 1 and all the audio 2, and the third audio is formed by combining the audio 1 and the audio 2, and is formed by combining the audio 1 and the audio 2 according to the specified weights in the process of switching between the audio 1 and the audio 2. The electronic device may store the video recording file, which may be stored in an internal memory or an external memory, for example, stored in the album icon.

It should be understood that the video recording file (that is, a target video recording file) finally stored in the album is a video recording file obtained through processing by the electronic device, for example, processing such as combining a plurality of channels of audio, performing image recognition on a speaker, and when it is detected that the speaker starts to speak, increasing a volume of the audio 1 in the third audio, so that the volume of the audio 1 is increased when the speaker starts to speak. The processing procedure may be completed inside the electronic device until the final video recording file is obtained and stored in the album.

In the scenario shown in FIG. 4A, in an embodiment, when the electronic device performs recording from a front-facing viewing angle by using a front-facing camera and performs recording from a rear-facing viewing angle in the background by using a rear-facing camera, a rear-facing video picture is not displayed in the photographing preview interface of the electronic device, but the rear-facing video picture recorded by using the rear-facing camera is stored, for example, stored in the buffer of the electronic device, so as to detect a mouth opening action of the speaker 2. For example, at a moment t1, the speaker 2 opens the mouth and starts to speak. During playback of the video recording file, the electronic device displays the front-facing video picture, and when a picture corresponding to the moment t1 is played, an audio feature of the audio 2 changes, for example, a sound of the audio 2 is increased.

In an embodiment, a front-facing video picture recorded by using the front-facing camera is stored in the electronic device, for example, stored in the buffer of the electronic device, so as to detect a mouth opening action of the speaker 1. For example, at a moment t2, the speaker 1 opens the mouth and starts to speak. During playback of the video recording file, the electronic device displays the front-facing video picture, and when a picture corresponding to the moment t2 is played, an audio feature of the audio 1 changes, for example, a sound of the audio 1 is increased.

In an embodiment, when the electronic device performs recording from a front-facing viewing angle by using a front-facing camera and performs recording from a rear-facing viewing angle in the background by using a rear-facing camera, a rear-facing video picture is not displayed in the photographing preview interface of the electronic device, but a front-facing video picture and the rear-facing video picture are stored simultaneously, so as to detect mouth opening actions of the speaker 1 and the speaker 2. For example, at a moment t3, the speaker 1 opens the mouth and starts to speak; and at a moment t4, the speaker 2 opens the mouth and starts to speak. During playback of the video recording file, the electronic device displays the front-facing video picture, and when a picture corresponding to the moment t3 is played, an audio feature of the audio 1 changes, for example, a sound of the audio 1 is increased. When a picture corresponding to the moment t4 is played, the audio feature of the audio 2 changes, for example, the sound of the audio 2 is increased.

In a possible implementation, the processing procedure may alternatively be completed on a cloud server. For example, during video recording or after video recording is ended, the electronic device and the wireless microphone may send an obtained video and obtained audio to the cloud server; or the wireless microphone first sends recorded audio to the electronic device, and then the electronic device sends the recorded audio to the cloud server; then the cloud server completes the processing procedure, to generate a final video recording file, and further sends the final video recording file to the electronic device; and the electronic device stores the video recording file in the album. It should be understood that the processing manner may be used in all video recording scenarios. To avoid repetition, details are not described below again in descriptions of other scenarios.

In another scenario, FIG. 4B is a schematic diagram in which an electronic device records a plurality of channels of audio by using two wireless microphones in a rear-facing single-channel video recording mode. A wireless microphone 1 may be, for example, a wireless headset, and is worn by a speaker 1 located in a front-facing viewing angle, and a wireless microphone 2 may be, for example, a mobile phone (or a wireless headset) of a speaker 2, and is carried by the speaker 2 located in a rear-facing viewing angle range. In addition, recording may be further performed by using a local microphone from the front-facing viewing angle.

It should be understood that in an actual application, a type of the wireless microphone is not limited to the wireless headset and the mobile phone shown in FIG. 4B, and the wireless microphone may alternatively be another device with a sound recording function. This is not limited in this application.

For example, in this case, after the electronic device enters a rear-facing single-channel video recording mode, as shown in FIG. 4B, the electronic device records, by using a rear-facing camera, a video image of the speaker 2 located in a rear-facing viewing angle, and a rear-facing video picture is displayed in the photographing preview interface of the electronic device. In addition, during video recording, the wireless microphone 1 worn by the speaker 1 records voice (which is denoted as audio 1) of the speaker 1, and the wireless microphone 2 carried by the speaker 2 records voice (which is denoted as audio 2) of the speaker 2.

In an implementation, in the rear-facing single-channel video recording process, the front-facing camera of the electronic device is started in the background and records the image of the speaker 1. The image of the speaker 1 is used for recognizing whether the speaker 1 speaks when the electronic device performs audio processing. It should be understood that the front-facing camera being started in the background described herein means that during video recording, the front-facing camera acquires a video picture from a front-facing viewing angle in real time, but the front-facing video picture is not displayed in the photographing preview interface. After a video recording file is generated, the video recording file does not include the front-facing video picture, and during video playback later, the front-facing video picture is also not displayed in a playback interface.

In the scenario shown in FIG. 4B, in an embodiment, when the electronic device performs recording from the rear-facing viewing angle by using the rear-facing camera and performs recording from the front-facing viewing angle in the background by using the front-facing camera, the front-facing video picture is not displayed in the photographing preview interface of the electronic device, but the front-facing video picture recorded by using the front-facing camera is stored, for example, stored in the buffer of the electronic device, so as to detect a mouth opening action of the speaker 1. For example, at a moment t5, the speaker 1 opens the mouth and starts to speak. During playback of the video recording file, the electronic device displays the front-facing video picture, and when a picture corresponding to the moment t5 is played, an audio feature of the audio 1 changes, for example, a sound of the audio 1 is increased.

In an embodiment, the rear-facing video picture recorded by using the rear-facing camera is stored in the electronic device, for example, stored in the buffer of the electronic device, so as to detect a mouth opening action of the speaker 2. For example, at a moment t6, the speaker 2 opens the mouth and starts to speak. During playback of the video recording file, the electronic device displays the front-facing video picture, and when a picture corresponding to the moment t6 is played, an audio feature of the audio 2 changes, for example, a sound of the audio 2 is increased.

In an embodiment, when the electronic device performs recording from a rear-facing viewing angle by using a rear-facing camera and performs recording from a front-facing viewing angle in the background by using a front-facing camera, a front-facing video picture is not displayed in the photographing preview interface of the electronic device, but the front-facing video picture and a rear-facing video picture are stored simultaneously, so as to detect mouth opening actions of the speaker 1 and the speaker 2. For example, at a moment t7, the speaker 2 opens the mouth and starts to speak; and at a moment t8, the speaker 1 opens the mouth and starts to speak. During playback of the video recording file, the electronic device displays the front-facing video picture, and when a picture corresponding to the moment t7 is played, an audio feature of the audio 2 changes, for example, a sound of the audio 2 is increased. When a picture corresponding to the moment t8 is played, the audio feature of the audio 1 changes, for example, the sound of the audio 1 is increased.

During video recording or after video recording is completed, the wireless microphone 1 sends the audio 1 to the electronic device, and the wireless microphone 2 sends the audio 2 to the electronic device.

When the user taps/clicks a control for ending video recording, the electronic device ends video recording in response to a tap/click operation of the user and exits the video recording mode. After video recording is ended, the electronic device generates a video recording file. The video recording file includes the front-facing video picture and third audio, and the third audio is third audio of the audio 1 and the audio 2. The electronic device may store the video recording file, for example, in the album icon.

It should be understood that the video recording file finally stored in the album is a video recording file processed by the electronic device, for example, a plurality of channels of audio are combined, image recognition is performed on the speaker 1, and when it is detected that the speaker 1 starts to speak, a volume of the audio 1 in the third audio is increased, so that the volume of the audio 1 is increased when the speaker starts to speak. The processing procedure may be completed inside the electronic device until the final video recording file is obtained and stored in the album.

In a scenario, FIG. 4C is a schematic diagram of a case in which an electronic device, in a front-facing and rear-facing multi-channel video recording mode, records a plurality of channels of audio by using two wireless microphones. A wireless microphone 1 may be, for example, a wireless headset, and is worn by a speaker 1 located in a front-facing viewing angle, and a wireless microphone 2 may be, for example, a wireless headset (or a mobile phone) of a speaker 2, and is carried by the speaker 2 located in a rear-facing viewing angle range. In addition, recording may be further performed by using a local microphone from the front-facing viewing angle.

It should be understood that in an actual application, a type of the wireless microphone is not limited to the wireless headset and the mobile phone shown in FIG. 4C, and the wireless microphone may alternatively be another device with a sound recording function. This is not limited in this application.

For example, in this case, after the electronic device enters a front-facing and rear-facing multi-channel video recording mode, as shown in FIG. 4C, the electronic device records a video image of the speaker 1 in the front-facing viewing angle by using a front-facing camera and records a video image of the speaker 2 in the rear-facing viewing angle by using a rear-facing camera, and a front-facing video picture and a rear-facing video picture are displayed in the photographing preview interface of the electronic device. In addition, during video recording, the wireless microphone 1 worn by the speaker 1 records voice (which is denoted as audio 1) of the speaker 1, and the wireless microphone 2 carried by the speaker 2 records voice (which is denoted as audio 2) of the speaker 2.

In an implementation, during video recording, the image of the speaker 1 is recorded. The image of the speaker 1 is used for recognizing whether the speaker 1 speaks when the electronic device performs audio processing. It should be understood that the front-facing camera being started in the background described herein means that during video recording, the front-facing camera acquires a video picture from a front-facing viewing angle in real time, but the front-facing video picture is not displayed in the photographing preview interface. After a video recording file is generated, the video recording file does not include the front-facing video picture, and during video playback later, the front-facing video picture is also not displayed in a playback interface.

In an embodiment, the front-facing video picture and the rear-facing video picture are stored simultaneously, so as to detect mouth opening actions of the speaker 1 and the speaker 2. For example, at a moment t9, the speaker 2 opens the mouth and starts to speak; and at a moment t10, the speaker 1 opens the mouth and starts to speak. When a video recording file is played, the electronic device displays the front-facing video picture and the rear-facing video picture, and when a picture corresponding to the moment t9 is played, an audio feature of the audio 2 changes, for example, a sound of the audio 2 is increased. When a picture corresponding to the moment t10 is played, the audio feature of the audio 1 changes, for example, the sound of the audio 1 is increased.

During video recording or after video recording is completed, the wireless microphone 1 sends the audio 1 to the electronic device, and the wireless microphone 2 sends the audio 2 to the electronic device.

When the user taps/clicks a control for ending video recording, the electronic device exits the video recording mode in response to a tap/click operation of the user. After video recording is ended, the electronic device generates a video recording file. The video recording file includes the front-facing video picture and third audio, and the third audio is third audio of the audio 1 and the audio 2. The electronic device may store the video recording file, for example, in the album icon.

It should be understood that the video recording file finally stored in the album is a video recording file processed by the electronic device, for example, a plurality of channels of audio are combined, image recognition is performed on the speaker 1, and when it is detected that the speaker 1 starts to speak, a volume of the audio 1 in the third audio is increased, so that the volume of the audio 1 is increased when the speaker starts to speak. The processing procedure may be completed inside the electronic device until the final video recording file is obtained and stored in the album.

In the scenarios, the electronic device records two channels of audio during video recording. In addition, in some embodiments, during video recording, the electronic device may further record three or more channels of audio, and the third audio may include the three or more channels of audio. In some scenarios, at least two of the first audio, the second audio, or the third audio may be further stored in the internal memory or the external memory, and the user may voluntarily choose to synthesize different pieces of audio, to increase flexibility.

In an implementation, when video recording is performed through joint sound recording of the local microphone and the wireless microphone, the user may be prompted to select, based on a positioning function between the electronic device and the wireless microphone, a wireless microphone at a proper position for sound recording.

Figure 5A:
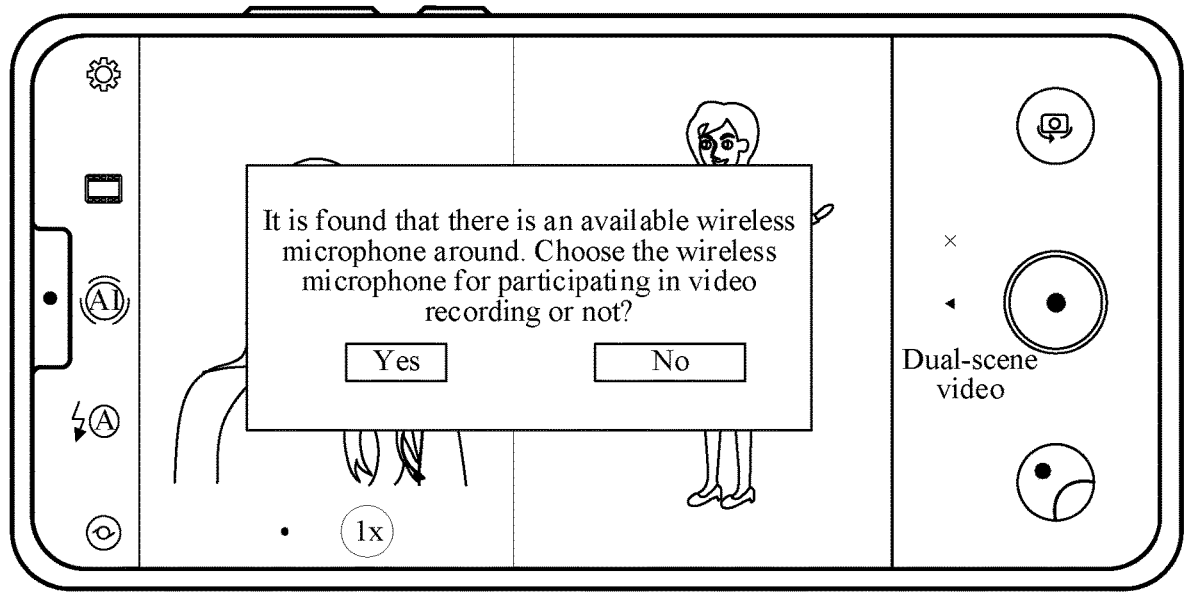
FIG. 5A and FIG. 5B are schematic diagrams of some other possible application scenarios of an audio processing method according to an embodiment of this application.
Figure 5B:
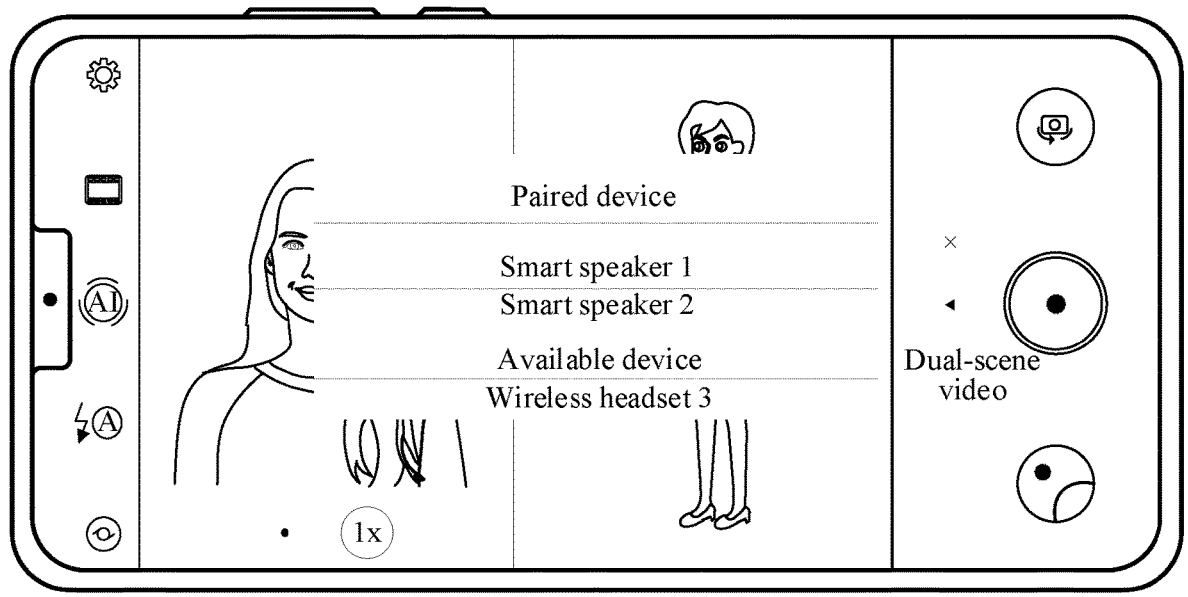

A front-facing and rear-facing dual-scene video recording mode is used as an example. FIG. 5A and FIG. 5B are schematic diagrams of a scenario in which an electronic device uses a local microphone and a wireless microphone that jointly participate in sound recording in a front-facing and rear-facing dual-channel video recording mode in an indoor scenario.

The electronic device and the wireless microphone may be connected to the same access point AP, or use the same Wi-Fi.

In an implementation, the electronic device sends a broadcast message, where the broadcast message is used for requesting to establish a wireless connection (for example, pairing); and after receiving the broadcast message, the wireless microphone establishes a wireless connection, that is, implements pairing, with the electronic device according to the broadcast message. Alternatively, the wireless microphone sends a broadcast message for requesting a wireless connection, and after receiving the broadcast message, the electronic device establishes a wireless connection with the wireless microphone according to the broadcast message.

The wireless connection establishment process may occur when the electronic device starts a video recording mode. For example, the electronic device sends the broadcast message in response to starting of the video recording mode and performs the pairing process. Alternatively, the wireless connection establishment process may occur before video recording.

For example, when performing front-facing and rear-facing dual-scene video recording, the user performs operations according to FIG. 3A to FIG. 3C. Subsequently, the electronic device detects that the user taps/clicks a dual-scene video recording icon, and the electronic device may display a prompt message in response to a tap/click action. As shown in FIG. 5A, content of the prompt message may be, for example, "It is found that there is an available wireless microphone around. Choose the wireless microphone for participating in video recording or not?". When detecting that the user taps/clicks a "Yes" option, the electronic device may continue to display a prompt message. As shown in FIG. 5B, content of the prompt message may be a name, a model, and the like of a currently available wireless microphone device and may include "Paired device" and "Available device"; and the user may select a proper wireless microphone to participate in video recording. After the electronic device detects one or more microphones tapped/clicked by the user, the electronic device performs a current wireless connection with the one or more microphones.

"Paired device" represents a device that has been paired with the electronic device and is within a range of wireless communication. If the user selects any one or more paired devices (for example, a device having a microphone such as a smart speaker or a wireless headset, that is, a wireless microphone) from "Paired device", the electronic device establishes a wireless connection with the paired device, and data is transmitted between the paired device and the electronic device. When the electronic device photographs a video, the paired device may transmit data acquired by the microphone to the electronic device.

"Available device" represents a device that can be paired with the electronic device and is within the range of wireless communication. If the user selects any one or more available devices (for example, a device having a microphone such as a smart speaker or a wireless headset, that is, a wireless microphone) from "Available device", the electronic device performs pairing with the available device. After pairing is completed, a wireless connection is established between the electronic device and the available device, and data is transmitted between the available device and the electronic device. When the electronic device photographs a video, the available device may transmit data acquired by the microphone to the electronic device.

Figure 6:
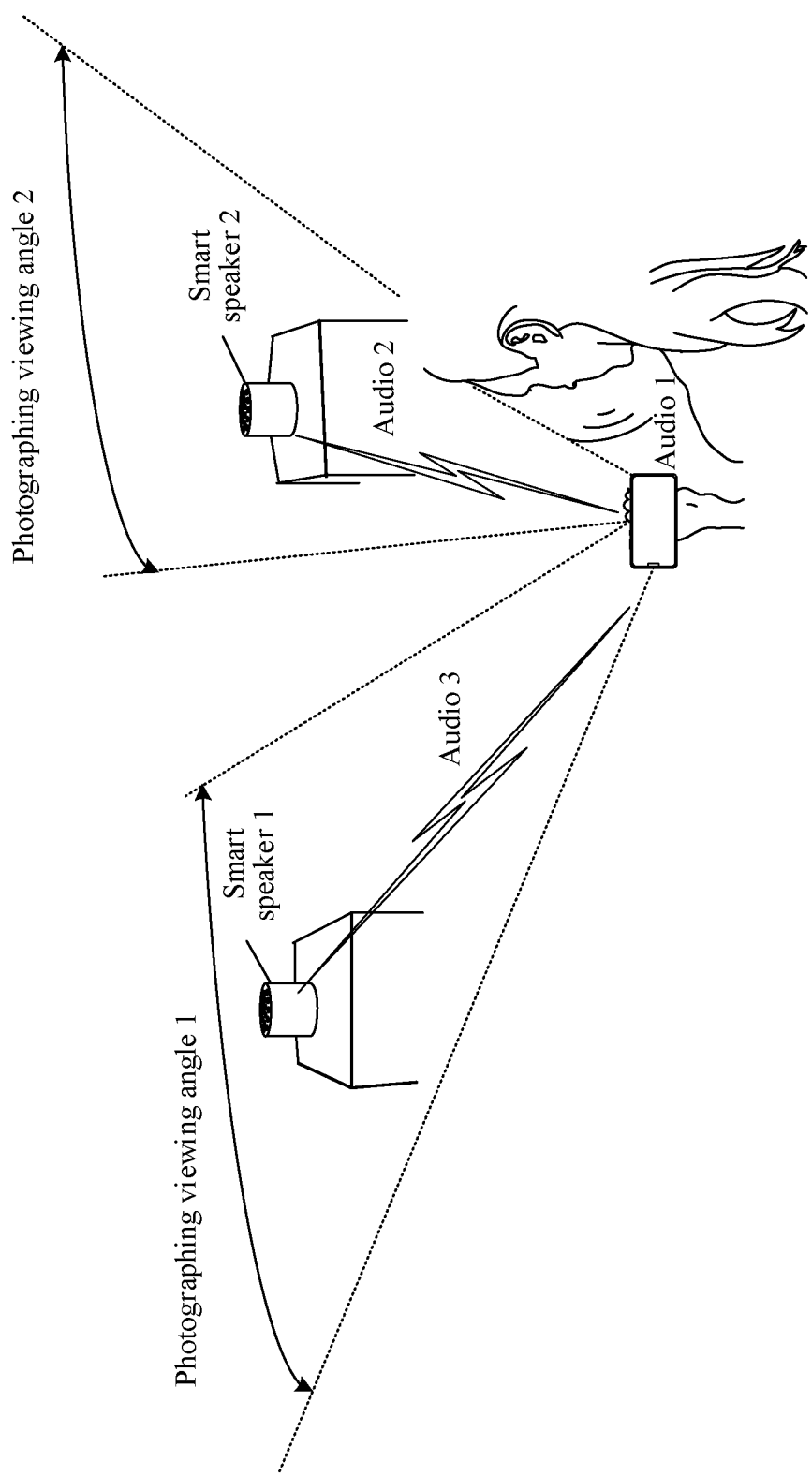
FIG. 6 is a schematic diagram of a possible application scenario of an audio processing method according to an embodiment of this application.

In an implementation, the electronic device and the wireless microphone may implement positioning of the wireless microphone based on a positioning function or a distance measurement function, and then automatically select, according to a video recording viewing angle, a wireless microphone within the viewing angle range for sound recording. For example, as shown in FIG. 6, when the electronic device performs video recording in a front-facing and rear-facing dual-scene video recording mode and enters the dual-scene video recording mode, the electronic device detects a wireless microphone device (for example, a smart speaker 1 or a smart speaker 2) selected by the user according to FIG. 5A and FIG. 5B.

During video recording, audio corresponding to a front-facing viewing angle is recorded by using the local microphone of the electronic device, and audio corresponding to a rear-facing viewing angle is recorded by using the smart speaker 1 or the smart speaker 2. It is assumed that at an initial stage, the rear-facing viewing angle is a photographing viewing angle 1 shown in FIG. 6, the electronic device learns, based on a position of the smart speaker 1, that the smart speaker 1 is located in a range of the photographing viewing angle 1, the electronic device automatically implements a current connection with the smart speaker 1, and the smart speaker 1 performs sound recording from the rear-facing viewing angle. Subsequently, during video recording, if the rear-facing viewing angle of the electronic device rotates, and the rear-facing viewing angle is switched from the photographing viewing angle 1 to a photographing viewing angle 2, the electronic device may be disconnected from the smart speaker 1 and automatically establishes a current wireless connection with the smart speaker 2, and the smart speaker 2 records the audio corresponding to the rear-facing viewing angle.

The video recording scenarios that may be involved in the audio processing method provided in the embodiments of this application and the embodiments of human computer interaction during video recording are described with reference to the accompanying drawings. To better understand the audio processing method provided in this application, a specific implementation process and algorithm are described below from an implementation level.

Figure 7:
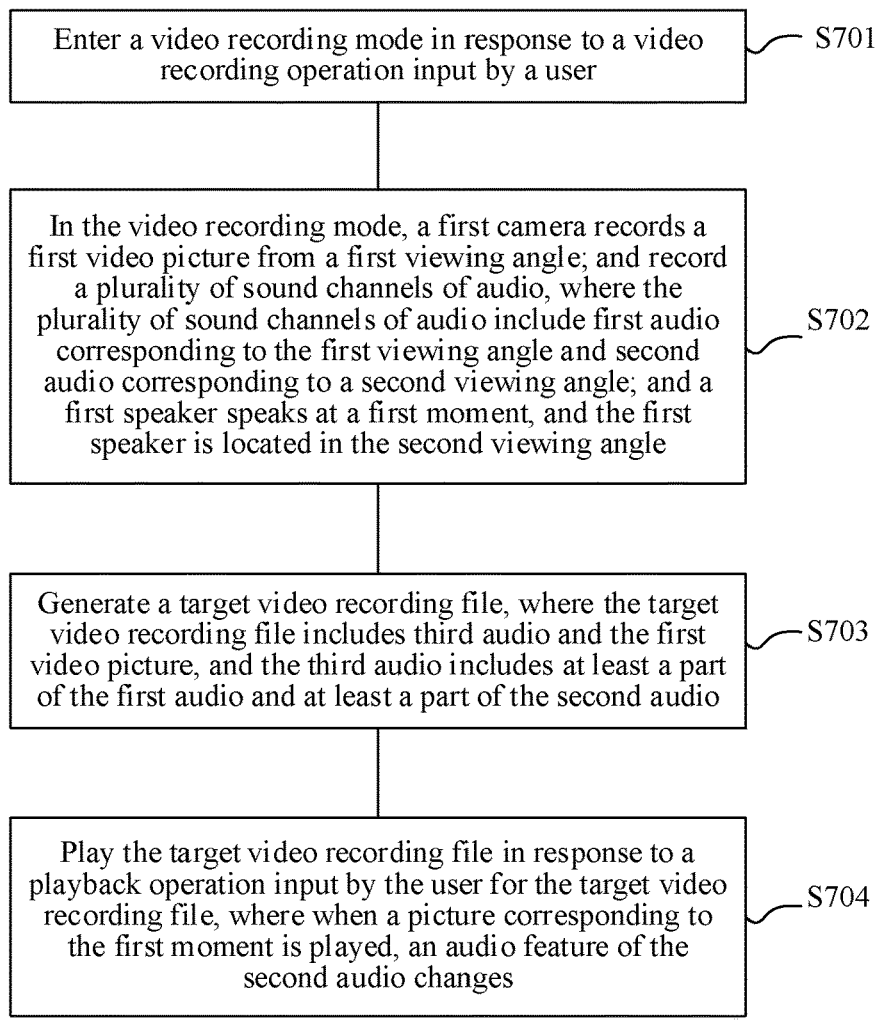
FIG. 7 is a schematic flowchart of an audio processing method according to an embodiment of this application.

FIG. 7 is a schematic diagram of an audio processing procedure according to an embodiment of this application. The audio processing method is applicable to an electronic device. The electronic device includes a first camera and a second camera, the first camera performs photographing from a first viewing angle, and the second camera performs photographing from a second viewing angle. The method includes the following steps.

S701. Enter a video recording mode in response to a video recording operation input by a user.

The video recording operation may be a single-channel video recording operation or a multi-channel video recording operation. Correspondingly, the electronic device enters a corresponding single-channel video recording mode or a corresponding multi-channel video recording mode in response to the video recording operation.

For example, as shown in FIG. 3A, the user taps/clicks the camera application in the main interface, and the electronic device displays a photographing preview interface in response to a tap/click operation of the user. The photographing preview interface may correspond to FIG. 3B.

The video recording operation herein may be an operation that the user taps/clicks a photographing control 304 in the photographing preview interface, and the operation is responded; or an operation that the user taps/clicks a dual-scene video recording control in the More function interface shown in FIG. 3D; or an operation that the user taps/clicks a multi-channel video recording control in the More function interface.

After detecting the video recording operation of the user, the electronic device enters the corresponding video recording mode. For example, after an operation that the user taps/clicks the photographing control shown in FIG. 3A is detected, a single-channel video recording mode is entered; or after an operation that the user taps/clicks the dual-channel video recording control in the interface shown in FIG. 3D, a dual-channel video recording (or referred to as dual-scene video recording) mode is entered.

S702. In the video recording mode, the first camera records a first video picture from the first viewing angle; and record a plurality of sound channels of audio, where the plurality of sound channels of audio include first audio corresponding to the first viewing angle and second audio corresponding to the second viewing angle; and a first speaker speaks at a first moment, and the first speaker is located in the second viewing angle.

In an implementation, the first camera may be a front-facing camera, the first viewing angle is a front-facing viewing angle, and the first video picture is a front-facing video picture; and the second viewing angle is a rear-facing viewing angle, the first speaker is located in a rear-facing viewing angle range, and the second audio may include voice of the first speaker. For example, this may correspond to the scenario shown in FIG. 4B. In this case, the first speaker corresponds to the speaker 2 in FIG. 4B.

In an implementation, the first camera may be a rear-facing camera, the first viewing angle is a rear-facing viewing angle, and the first video picture is a rear-facing video picture; and the second viewing angle is a front-facing viewing angle, the first speaker is within a front-facing viewing angle range, and the second audio may include voice of the first speaker. For example, this may correspond to the scenario shown in FIG. 4B. In this case, the first speaker corresponds to the speaker 1 in FIG. 4B.

In an implementation, a plurality of sound channels of audio may be respectively recorded by using at least two microphones. The at least two microphones may include a local microphone of a mobile phone and/or a wireless microphone. Specifically, the plurality of sound channels of audio may be respectively acquired by using the local microphone of the electronic device and the wireless microphone; or may be acquired by using a plurality of wireless microphones; or may be acquired by using a plurality of local microphones.

It should be understood that the wireless microphone in this application may be various devices with a microphone function, and the wireless microphone may establish a wireless connection with the mobile phone before performing a recording operation. The wireless microphone may be, for example, a device that can implement a microphone function such as a wireless headset, a wireless speaker, or another mobile phone. This is not specifically limited in this application.

Optionally, the wireless microphone and the mobile phone may be connected in a plurality of wireless connection manners, for example, Bluetooth, wireless fidelity (Wi-Fi), a 5$^{th}$ generation (5G) mobile communication technology, and a 4$^{th}$ generation (4G) mobile communication technology.

In an implementation, that a first speaker speaks at a first moment may include that the first speaker opens the mouth at the first moment.

S703. Generate a target video recording file, where the target video recording file includes third audio and the first video picture, and the third audio includes at least a part of the first audio and at least a part of the second audio.

The third audio is audio obtained by combining a plurality of channels of audio. In other words, the third audio is third audio of the plurality of channels of audio. For example, during sound recording or after video recording is finished, the electronic device may combine the plurality of channels of audio according to preset weights, and obtain the third audio. In a sound recording combining process, an audio processor combines and encodes the plurality of channels of audio, to obtain the third audio.

In an implementation, the preset weights of the channels of audio may be set according to whether a speaker starts to speak. For example, when it is not detected that the speaker starts to speak in the first video picture, a weight of the first audio may be less than a first threshold, and the first threshold may be, for example, 0 or 0.2. When the weight of the first audio is 0, the third audio may be encoded in an encoding manner of the other channel of audio in two channels of audio.

It should be understood that when it is not detected that a speaker speaks in the first video picture, for example, a mouth opening action of the speaker is not detected, it indicates that the speaker does not make a sound, or there is no content required by the user in the audio corresponding to the first video picture. In this case, a gain proportion (or a weight) of the audio corresponding to the first viewing angle in the third audio may be reduced, to more present content of the other audio.

When it is detected that the speaker starts to speak in the first video picture, the weight of the audio corresponding to the first viewing angle in the third audio is adjusted to a target weight. For example, during foreground/background photographing is performed, where a user holding an electronic device starts to speak, a gain proportion of audio corresponding to the user in third audio is increased, to more highlight speech content of the user.

In an implementation, a process of determining whether the speaker starts to speak may be that: the electronic device performs image recognition according to an image of the speaker acquired by using a camera, and determines whether the speaker has a target action such as opening the mouth. If it is detected that the speaker has the target action, it indicates that the speaker starts to speak.

Specifically, an NPU computing processor of the electronic device performs recognition on the target action based on a graphics processing result of an ISP for the image of the speaker. For example, whether a photographed object opens the mouth is detected. When it is detected that the speaker has the target action, weights of a plurality of channels of audio of a specific frame are adjusted based on a currently buffered audio frame.

In an implementation, a weight adjustment policy may be preset, and when the target action is detected, weights of channels of audio are adjusted according to the weight adjustment policy. For example, in the weight adjustment policy, a weight of the first audio may be increased with time, and correspondingly, a weight of other audio may be decreased with time, to gradually switch from the other audio to the first audio, thereby implementing smooth switching between pieces of audio and avoiding the sound from changing suddenly.

Figure 8:
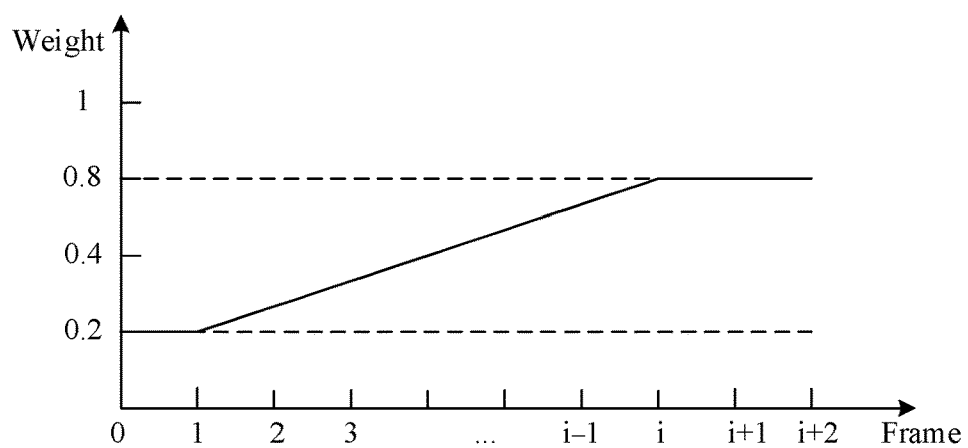
FIG. 8 is a schematic diagram of a change of an audio weight according to an embodiment of this application.

For example, the weight of the first audio may have a linear variation relationship with time shown in FIG. 8. In a schematic diagram of a relationship between the weight and time in FIG. 8, a horizontal axis is a time axis, a vertical axis is the weight of the first audio, and the weight of the first audio and the time are in a linear relationship from a start moment (a frame 1) of third audio to a frame i.

It should be understood that a relationship between a weight of each channel of audio and time may not be limited to the linear relationship, and a relationship between a weight and an audio combination time may further include various non-linear relationships while ensuring gradual switching between channels of audio. This is not limited in this application.

S704. Play the target video recording file in response to a playback operation input by the user for the target video recording file, where when a picture corresponding to the first moment is played, an audio feature of the second audio changes.

It should be understood that the target video recording file includes the first video picture and the third audio. Therefore, during playback of the target video recording file, the electronic device plays the third audio while playing the first video picture.

In an implementation, the target video recording file may further include a plurality of other video pictures, so that during playback of the target video recording file, the electronic device may play video pictures of a plurality of viewing angles and the third audio simultaneously.

In an implementation, when the picture corresponding to the first moment is played, the speaker starts to speak. In this case, an audio feature of audio corresponding to a viewing angle in which the speaker is located changes.

In an implementation, the audio feature includes a volume. During playback of the target video recording file, when the video picture corresponding to the first moment is played, the volume of the second audio is increased.

In an implementation, during playback of the target video recording file, when the video picture corresponding to the first moment is played, the volume of the second audio is gradually increased.

In an implementation, when the electronic device plays the target video recording file, the electronic device displays the first video picture and the second video picture.

In an implementation, when the electronic device plays the target video recording file, the electronic device displays the first video picture but does not display the second video picture.

In an implementation, during playback of the target video recording file, the first speaker in the second video picture opens the mouth at the first moment.

The electronic device may set a playback track for playing the third audio as a default track of video recording, so that the third audio is played by default when the video recording work is played; or the third audio is shared by default when the video recording work is shared. The playback track is a playback channel during audio playback.

In the audio processing method provided in this embodiment of this application, the mobile phone may store a plurality of channels of audio that are obtained in a memory, and combine the plurality of channels of audio, to obtain third audio of the plurality of channels of audio. Specifically, the mobile phone may set different preset weights for different pieces of audio at different playback times, and weight data (for example, a sampling rate) of the plurality of channels of audio according to the preset weights, to obtain the third audio.

The mobile phone obtains an image of a speaker by using a front-facing camera, and determines whether the speaker starts to speak according to the image of the speaker. If it is determined that the speaker starts to speak, a weight of audio corresponding to the front-facing picture in the third audio may be adjusted, for example, a proportion of near-end audio (for example, audio of the speaker) of the mobile phone is dynamically increased, so that the third audio is gradually switched to the near-end audio of the mobile phone, to highlight content of the audio.

According to the audio processing method provided in this embodiment of this application, by using a target result detected based on a photographed video image, weights of pieces of audio corresponding to the video image in third audio are adjusted, to optimize an effect of switching between the pieces of audio based on presentation of complete audio, thereby resolving a feeling of a sudden change of sound caused by switching required for obtaining audio content when an electronic device that does not support playback of a plurality of channels of audio plays a video.

An internal implementation process and a processing procedure of the audio processing method provided in the embodiments of this application are described below with reference to the accompanying drawings by using a scenario of front-facing and rear-facing dual-channel video recording of a mobile phone as an example. The audio processing method provided in the embodiments of this application may be performed in real time during video recording, or may be performed after video recording. Descriptions are provided below by using an example in which audio processing is performed during video recording.

Figure 9:
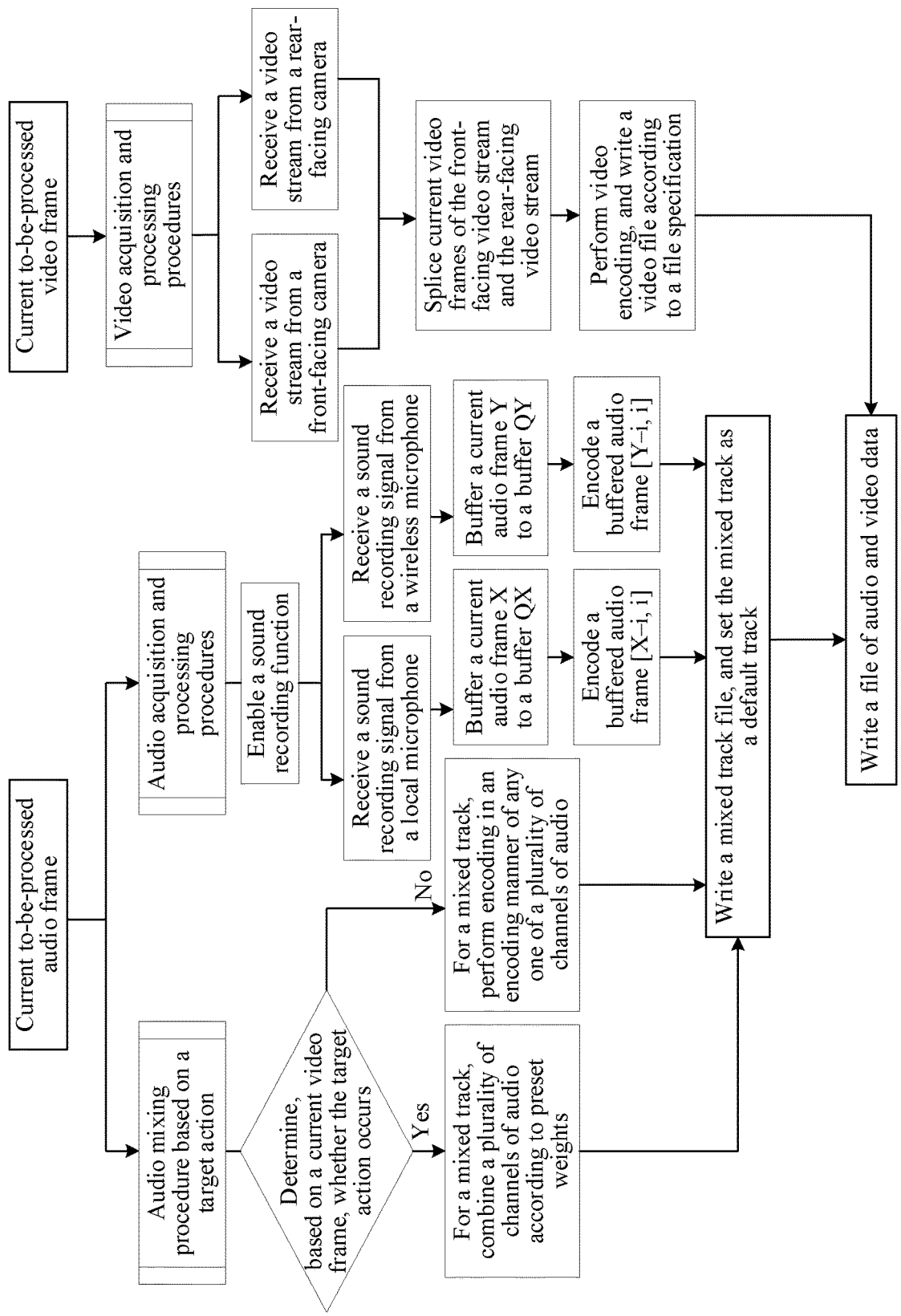
FIG. 9 is a schematic flowchart of another audio processing method according to an embodiment of this application.

When a user performs video recording by using a mobile phone, the electronic device may perform operation procedures, such as video processing, audio processing, and audio mixing, based on image recognition simultaneously. For ease of understanding, the processing procedures are described by using a front-facing and rear-facing dual-channel video recording mode as an example as well as a frame of audio and a frame of video as an example. As shown in FIG. 9, the processes may include the following content.

In an implementation, the video recording and video processing procedures may include that: in a current front-facing and rear-facing dual-channel video recording mode, the electronic device respectively acquires a frame of front-facing video picture (which is denoted as a front-facing video frame ZX) and a frame of rear-facing video picture (which is denoted as rear-facing video frame ZY) by using a front-facing camera and a rear-facing camera; the front-facing camera and the rear-facing camera respectively transmit acquired video data to an ISP of the electronic device; and the electronic device may splice the front-facing video frame ZX and the rear-facing video frame ZY by using, for example, an open graphics library (openGL) interface, perform video encoding by using a video codec, and then write the spliced front-facing video frame ZX and rear-facing video frame ZY into a target video recording file according to a specific file specification (for example, an MP4 container file specification).

In an implementation, the sound recording and audio processing procedures may include that: in the current front-facing and rear-facing dual-channel video recording mode, the electronic device may record a frame of audio (which is denoted as an audio frame X) by using a local microphone and record a frame of audio (which is denoted as an audio frame Y) by using a wireless microphone; after receiving audio data, the electronic device may buffer the audio data in a buffer (for example, a buffer in an internal memory), where audio data of different sound channels may be buffered in different buffers, for example, the audio frame X is buffered into a buffer QX, and the audio frame Y is buffered into a buffer QY; and after receiving a plurality of channels of audio data, an audio processor may encode each channel of audio data independently and write a current frame of audio data of each channel of encoded audio into a multi-channel audio file. An encoding manner may include, for example, pulse code modulation (PCM) and advanced audio coding (AAC). A format of encoded target audio may include a wave form sound file WAV format, an MP3 format, or the like. After the audio frame X and the audio frame Y are processed, a processed audio frame X and a processed audio frame Y may be written into the target video recording file, or the multi-channel audio file is written into the target sound recording file.

In addition, the audio processor may combine the audio frame X and the audio frame Y according to preset weights, for example, combine and encode two channels of audio according to specific proportional gains, to obtain third audio.

Sampling rates of various channels of audio may be the same or different. In this embodiment of this application, descriptions are made by using the same sampling rate (for example, 8 bits) for channels of audio.

In an implementation, the audio mixing process based on image recognition may include that: in the current front-facing and rear-facing dual-channel video recording mode, the front-facing video picture acquired by the front-facing camera of the electronic device includes a speaker, and after the electronic device transmits an acquired video frame to the ISP, the ISP processes the video frame, and then the video stream may be divided into two paths, one path of video stream data is used for combination with a rear-facing video image, and the other path of video stream is used by the electronic device for image recognition and determining whether the speaker speaks.

Figure 10:
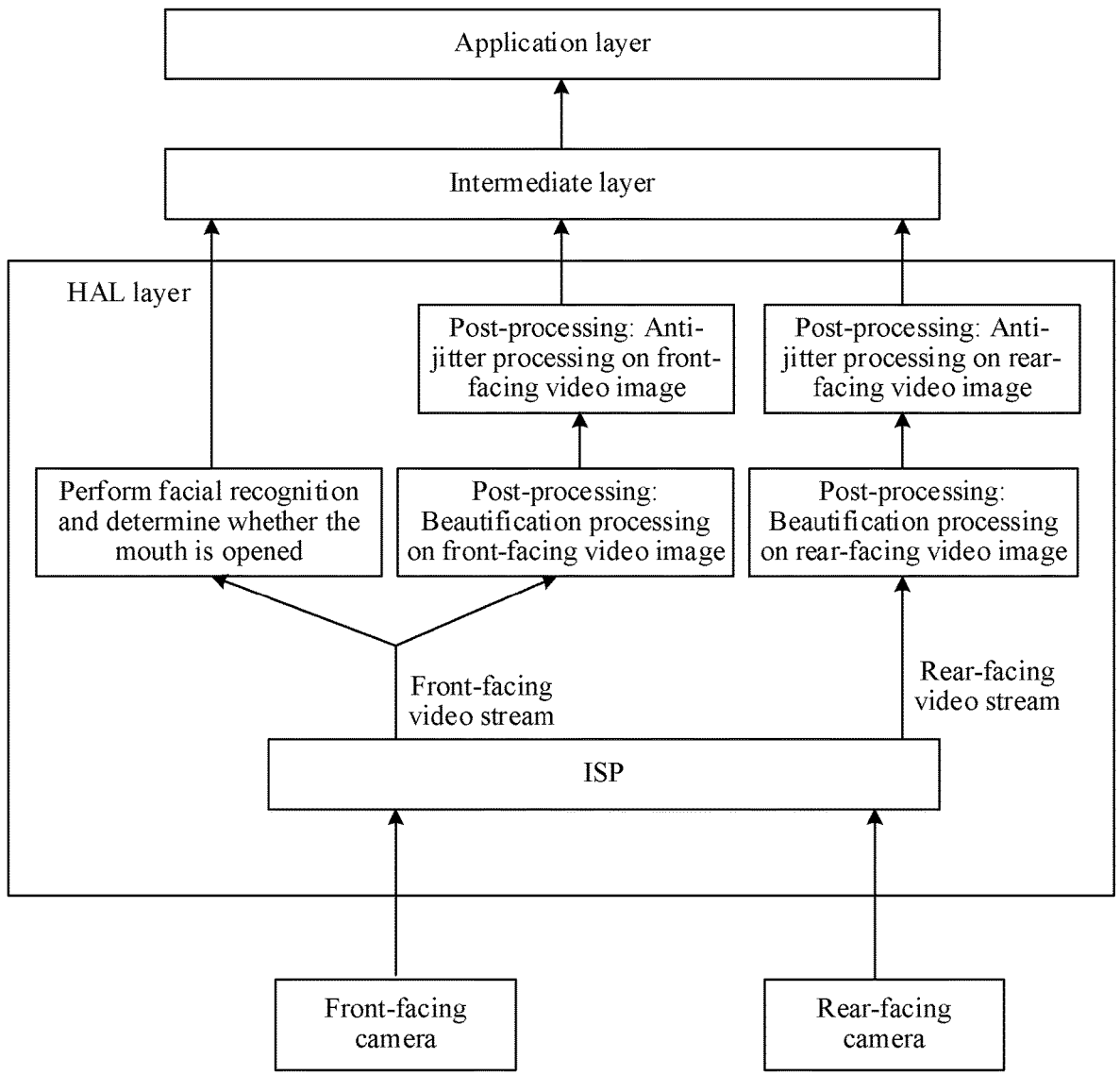
FIG. 10 is a schematic diagram of combining a plurality of channels of audio according to an embodiment of this application.

To better understand the process, detailed descriptions are made with reference to a schematic diagram of a software architecture shown in FIG. 10.

It should be understood that descriptions are made by using an example in which a video image is processed at a hardware abstraction layer HAL. However, in an actual application, the video processing procedure, the audio processing procedure, and the facial recognition process are not limited to being implemented at the HAL layer, and may be implemented at an intermediate layer or an application layer. This is not limited in this application. The HAL herein may be an interface layer between the kernel layer and the hardware layer shown in FIG. 2; the intermediate layer may be the system library and the application framework layer shown in FIG. 2; and the application layer may be the application layer shown in FIG. 2.

The front-facing camera transmits an image signal of the acquired front-facing video frame ZX to the ISP for image processing, and the rear-facing camera transmits an image signal of the acquired rear-facing video frame ZY to the ISP for image processing; and after processing is completed, the ISP transmits a rear-facing video stream to a post-processing unit, for example, transmits the rear-facing video stream to a beautification processing unit, to perform beautification processing on the rear-facing video image, and then transmits the rear-facing video image to an anti jitter processing unit, to perform anti jitter processing on the rear-facing video image. In addition, the ISP may respectively transmit a front-facing video stream to a facial recognition unit and a front-facing image post-processing unit. The facial recognition unit is configured to perform facial recognition on a speaker in the front-facing video picture, determine whether the speaker opens the mouth, and further determine whether the speaker speaks, and the post-processing unit is configured to perform beautification processing and anti jitter processing on the front-facing video image.

For example, the determining, according to the front-facing video image, whether the speaker speaks may further include the following specific content.

The front-facing video frame is transmitted to an NPU computing processor for image recognition, after receiving image input information of a current frame, the NPU computing processor rapidly processes the input information, for example, performs face detection on the speaker based on the obtained current video frame ZX, which includes determining whether the speaker has a target action by using a face coordinate AI algorithm. If it is determined that the speaker in the current video frame has the target action, it indicates that the speaker starts to speak, and the audio processor adjusts weights of channels of audio in third audio i frames in advance based on a moment when it is detected that the speaker speaks, that is, adjusts a formed weight of an audio frame [X–i, X] and an audio frame [Y–i, Y] in the third audio. If the target action is not detected, audio recorded by the local microphone and audio recorded by the wireless microphone are still combined and encoded according to preset proportional gains for the combined audio. In this case, a gain of the audio frame X recorded by the local microphone may be set to, for example, 0.

In addition, post-processing in the process includes, for example: optimizing an image color by using YUV with reference to face coordinates, and obtaining a front-facing video frame and a rear-facing video frame that have a beautification effect; and then performing anti jitter processing on a current frame of video image.

For example, in the process, the video images have the same quantity of frames per second, for example, 30 fps.

For a process of performing beautification processing and anti jitter processing on the current frame of video picture, refer to the prior art. Details are not described herein again.

It should be understood that a moment when the electronic device detects that the speaker starts to speak lags behind a moment when the speaker actually starts to speak, that is, when the electronic device determines that the speaker starts to speak, an audio frame corresponding to the moment when the speaker actually starts to speak has been buffered in a buffer. Therefore, weights of channels of audio are adjusted i frames in advance, to overcome a time delay caused by a process in which the electronic device determines that the speaker starts to speak, thereby ensuring integrity of audio content.

Optionally, the channels of audio are encoded i frames (i is an integer greater than or equal to 1) in advance from a current audio frame X, and the encoded audio data is written into the multi-channel audio file. In addition, the obtained multi-channel audio data is written into a target audio and video file corresponding to a current frame, to obtain a current video and a third audio file corresponding to the video.

It should be understood that for audio frames and video frames, both a video and audio are processed by using the method, and completely combined audio corresponding to video pictures and a smooth audio switching effect are obtained in addition to ensuring independent audio of each sound channel.

With reference to the foregoing embodiments and related accompanying drawings, an embodiment of this application further provides an audio processing method, and the method may be implemented in the electronic device (for example, a mobile phone or a tablet computer) having a camera and a microphone shown in FIG. 1 and FIG. 2. FIG. 11 is a schematic flowchart of another audio processing method according to an embodiment of this application. As shown in FIG. 11, the method may include the following steps.

S1101. Buffer an audio frame of first audio, an audio frame of second audio, and a video frame of a first video picture in a video recording mode.

In an implementation, an audio frame currently obtained by each microphone is recorded as a first audio frame. Sampling rates of various channels of audio may be the same or different. Descriptions are made by using the same sampling rate (for example, 8 bits) for the channels of audio herein.

For example, an audio frame (which is denoted as an audio frame X) currently recorded by the local microphone may be stored in a first buffer (which is denoted as QX), and an audio frame (which is denoted as an audio frame Y) currently recorded by the wireless microphone may be stored in a second buffer (which is denoted as QY). In addition, local audio and wireless microphone audio within a preset time period before a current moment are also buffered at the corresponding position.

In an implementation, the current moment is denoted as N, audio data within a specific time period such as a time period of [N−2s, N] or [N−1s, N] before the current moment may be buffered; or audio data of a specific quantity of frames, such as an audio frame [X–i, X] of the local microphone and an audio frame [Y–i, Y] of the wireless microphone before a current audio frame, is buffered, where i is an integer greater than or equal to 1 and less than X and Y.

It should be understood that audio data within a specific time period is buffered, it can be ensured that complete audio content can be obtained in the third audio without storing all audio content, so that storage space is saved, and the audio processing efficiency is improved.

S1102. Detect an action of the first speaker.

For example, an action of the first speaker is detected through facial recognition. When it is detected that the first speaker has a mouth opening action, it is considered that the first speaker starts to speak.

S1103. Adjust an audio feature of the first audio in the third audio when it is detected that the first speaker starts to speak, and adjust an audio feature of the second audio in the third audio starting from i audio frames before a current audio frame, where i is greater than or equal to 1.

That a speaker starts to speak may mean that the speaker has a target action such as a mouth opening action. The electronic device may determine, based on the target action of the speaker, that the speaker starts to speak.

It should be understood that it takes a time for a process from a moment when the speaker has a target action to a moment when the electronic device detects the target action. As a result, an audio frame corresponding to a moment when the target action is detected may be later than that corresponding to a moment when the target action actually occurs. Therefore, to preset complete audio content, in this embodiment of this application, execution may be performed starting from a frame before a current frame when a plurality of channels of audio are combined.

The first audio frame may be an audio frame that is buffered in a buffer and that corresponds to a moment when the target action is detected. A start moment for combining the plurality of channels of audio may be determined based on the first audio frame. Specifically, a preset time length may be rolled back based on the currently buffered first audio frame, and combination of the plurality of channels of audio is started. The preset time length may be, for example, 100 ms.

In an implementation, i audio frames may be rolled back based on the currently buffered first audio frame, to start combination of the plurality of channels of audio.

It should be understood that one audio frame in this embodiment of this application may correspond to a time interval.

In an example, as shown in FIG. 12, it is assumed that when a target action is detected, a just buffered audio frame of audio recorded by the local microphone is [X], and a just buffered audio frame of audio recorded by the wireless microphone is [Y], so that when pieces of audio of the two channels of audio are combined, i frames may be rolled back, that is, an audio frame [X−i, X] and an audio frame [Y−i, Y] are combined, and an audio frame corresponding to obtained third audio may be [M−i, M]. Still further, a video frame corresponding to the audio within the time period may be [Z−i, Z], where i is an integer greater than or equal to 1, and X, Y, M, and Z are all integers greater than i.

According to the audio processing method provided in this embodiment of this application, a plurality of channels of audio are combined a specific time in advance relative to a moment when a target action is detected, and a problem of incomplete audio content or an incoherent sound effect caused by a time delay due to a process of detecting the target action can be avoided.

Using a scenario of combining two channels of audio as an example, a specific process of adjusting weights of channels of audio in third audio are described in detail. For ease of description, the two channels of audio are respectively denoted as audio 1 (that is, a track 1) and audio 2 (that is, a track 2), and combined audio is denoted as audio 3 (or referred to as a mixed track). In an actual application, the audio 1 may be, for example, audio recorded by the local microphone, and the audio 2 may be, for example, audio recorded by the wireless microphone.

In an example, as shown in FIG. 13, sampling rates of the audio 1 and the audio 2 are 8 bits, and to-be-combined audio frames are respectively [X−i, X] and [Y−i, Y], where audio data of the [X−i]$^{th}$ frame is 11, audio data of the [(X−i)+1]$^{th}$ frame is 12, and audio data of the [(X−i)+2]$^{th}$ frame is 200; audio data of the [Y−i]$^{th}$ frame is 21, audio data of the [(Y−i)+1]$^{th}$ frame is 22, and audio data of the [(Y−i)+2]$^{th}$ frame is 202.

For the audio 3 (or referred to as the mixed track) obtained by combining the audio 1 and the audio 2, for example, weights of the two channels of audio may both be set to 0.5. In this case, audio data corresponding to each frame of the audio 3 is as follows: audio data of the [Z−i]$^{th}$ frame is (11+21)/2=16, audio data of a [(Z−i)+1]$^{th}$ frame is (12+22)+/2=17, and audio data of a [(Z−i)+2]$^{th}$ frame is (200+202)/2=201.

Descriptions are made below by using an example in which weights of volumes of the audio 1 and the audio 2 are changed. In another embodiment, another audio feature may be further adjusted. When weights are dynamically changed with time, as shown in FIG. 8, the weight of the audio 1 is changed linearly with time. In this case, an adjustment process of the audio 1 and the audio 2 is as follows:

a weight $W_{11}$ of the first frame of the audio 1 is 0.2. In this case, a weight $W_{21}$ of the first frame of the audio 2 is $1-W_{11}=0.8$;

. . . ; and a weight $W_{1i}$ of the $i^{th}$ frame of the audio 1 is 0.8. In this case, a weight $W_{2i}$ of the $i^{th}$ frame of the audio 2 is $1-W_{1i}=0.2$.

Therefore, weights of the $h^{th}$ frames ($1\leq h\leq i$) of the audio 1 and the audio 2 may be represented as follows:

the $h^{th}$ frame of the audio 1: weight $$W_{1h} = W_{11} + (W_{1i} - W_{11}) * \frac{h-1}{i-1};$$

and the $h^{th}$ frame of the audio 2: weight $W_{2h}=1-W_{1h}$.

In addition, when n channels of audio are combined, weights of the channels of audio may also be adjusted by using a method similar to that of the combination of two channels of audio It is assumed that audio data from the first frame to the $n^{th}$ frame buffered for each audio is shown in FIG. 10, a weight W of each piece of audio of the $i^{th}$ frame and audio data Zi of the $i^{th}$ frame in the third audio may respectively satisfy the following formulas:

$$W_{1i} + W_{2i} + \ldots + W_{ni} = 1$$
$$Z_i = W_{1i} \times X_{1i} + W_{2i} \times X_{2i} + \ldots + W_{ni} \times X_{ni}$$

It should be understood that according to the audio processing method provided in this embodiment of this application, a sampling rate of audio may be 8 bits, 16 bits, or 24 bits. This is not limited in this application.

According to the audio processing method provided in the embodiments of this application, audio recorded by using a plurality of sound channels is completely played by using one track, smooth switching between videos can be implemented while ensuring complete audio content, and key content in a plurality of channels of audio is highlighted in a targeted manner. In addition, switching between channels of audio is performed naturally and smoothly, to bring a good listening experience to a user.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

In the embodiments, function modules of the electronic device may be divided based on the foregoing method example. For example, each function module may be divided according to each function, or two or more functions may be integrated into one processing module. The integrated module may be implemented in a form of hardware. It should be noted that, in this embodiment, the module division is an example, and is merely logical function division, and there may be other division modes during actual implementation.

An embodiment of this application further provides an electronic device, including one or more processors and one or more memories. The one or more memories are coupled to the one or more processors, the one or more memories are configured to store computer program code, the computer program code includes computer instructions, and when the one or more processors execute the computer instructions, the electronic device is enabled to perform the related method steps to implement the audio processing method in the foregoing embodiments.

An embodiment of this application further provides a computer-readable storage medium. The computer-readable storage medium stores computer instructions, and the computer instructions, when running on an electronic device, cause the electronic device to perform the related method steps, to implement the audio processing method in the foregoing embodiment.

An embodiment of this application further provides a computer program product. The computer program product, when running on a computer, causes the computer to perform the related steps, to implement the audio processing method performed by the electronic device in the foregoing embodiments.

In addition, an embodiment of this application further provides an apparatus. The apparatus may be specifically a chip, a component, a module, or a chip system. The apparatus may include a processor and a memory that are connected. The memory is configured to store computer-executable instructions, when the apparatus runs, the processor may execute the computer-executable instructions stored in the memory, so that the chip performs the audio processing method performed by the electronic device in the foregoing method embodiments.

The electronic device, the computer-readable storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

Based on the above, this application further provides the following embodiments:

Embodiment 1: An audio processing method is provided, applicable to an electronic device, where the electronic device includes a first camera and a second camera, the first camera performs photographing from a first viewing angle, and the second camera performs photographing from a second viewing angle, the method including:
  entering a video recording mode in response to a video recording operation input by the user; in the video recording mode, recording, by the first camera, a first video picture from the first viewing angle; and recording a plurality of sound channels of audio, where the plurality of sound channels of audio include first audio corresponding to the first viewing angle and second audio corresponding to the second viewing angle; and a first speaker speaks at a first moment, and the first speaker is located in the first viewing angle;
  generating a target video recording file, where the target video recording file includes third audio and the first video picture, and the third audio includes at least a part of the first audio and at least a part of the second audio; and
  playing the third audio and the first video picture in response to a playback operation input by the user for the target video recording file, where
  when a picture corresponding to the first moment is played, an audio feature of the second audio in the third audio changes.

Embodiment 2: The method according to Embodiment 1 is provided, where the audio feature includes a volume, and the playing the target video recording file further includes:
  increasing the volume of the second audio when the video picture corresponding to the first moment is played.

Embodiment 3. The method according to Embodiment 2 is provided, where when the video picture corresponding to the first moment is played, the volume of the first audio is gradually increased.

Embodiment 4: The method according to any one of Embodiments 1 to 3 is provided, where in the video recording mode, the second camera records the second video picture from the second viewing angle, the electronic device displays a photographing interface, and the photographing interface includes the first video picture and the second video picture;
  the target video recording file further includes the second video picture; and
  when the electronic device plays the target video recording file, the electronic device displays the first video picture and the second video picture.

Embodiment 5: The method according to any one of Embodiments 1 to 3 is provided, where in the video recording mode, the second camera records the second video picture from the second viewing angle, the electronic device displays a photographing interface, and the photographing interface does not include the second video picture; and
  when the electronic device plays the target video recording file, the electronic device does not display the second video picture.

Embodiment 6: The method according to any one of Embodiments 1 to 5 is provided, where in the video recording mode, the second camera records the second video picture from the second viewing angle, and the first speaker in the second video picture opens the mouth at the first moment.

Embodiment 7: The method according to any one of Embodiments 1 to 6 is provided, where in the video recording mode, a second speaker speaks at a second moment, and the second speaker is within the first viewing angle; and
  when the electronic device plays the target video recording file, when a picture corresponding to the second moment is played, an audio feature of the first audio in the third audio changes.

Embodiment 8: The method according to Embodiment 7 is provided, where when the picture corresponding to the second moment is played, a volume of the first audio in third audio is gradually increased.

Embodiment 9: The method according to any one of Embodiments 1 to 8 is provided, where the electronic device includes a first microphone and a second microphone; and
  in the video recording mode, the first microphone records the first audio, and the second microphone records the second audio; or
  in the video recording mode, the first microphone records the second audio, and the second microphone records the first audio.

Embodiment 10: The method according to any one of Embodiments 1 to 8 is provided, where the electronic device includes a first microphone, and a second microphone is in a wireless connection with the electronic device;

in the video recording mode, the first microphone records the first audio, the second microphone records the second audio, and the second audio is sent to the electronic device through the wireless connection; or in the video recording mode, the first microphone records the second audio, the second microphone records the first audio, and the first audio is sent to the electronic device through the wireless connection.

Embodiment 11: The method according to any one of Embodiments 1 to 8 is provided, where both a first microphone and a second microphone are in a wireless connection with the electronic device, and the first audio and the second audio are sent to the electronic device through the wireless connection; and in the video recording mode, the first microphone records the first audio, and the second microphone records the second audio; or in the video recording mode, the first microphone records the second audio, and the second microphone records the first audio.

Embodiment 12: The method according to any one of Embodiments 1 to 11 is provided, further including: buffering an audio frame of the first audio, an audio frame of the second audio, and a video frame of the first video picture in the video recording mode;

detecting an action of the first speaker; and adjusting an audio feature of the first audio in the third audio when it is detected that the first speaker starts to speak, and adjusting an audio feature of the second audio in the third audio starting from i audio frames before a current audio frame, where i is greater than or equal to 1.

Embodiment 13: The method according to any one of Embodiments 1 to 12 is provided, where: the first viewing angle and the second viewing angle are any two of a front-facing viewing angle, a wide-angle viewing angle, or a zoom viewing angle.

Embodiment 14: An audio processing method is provided, applicable to an electronic device, where the electronic device includes a first camera and a second camera, the first camera performs photographing from a first viewing angle, and the second camera performs photographing from a second viewing angle, the method including:

entering a video recording mode in response to a video recording operation input by the user; in the video recording mode, recording, by the first camera, a first video picture from the first viewing angle; and recording a plurality of sound channels of audio, where the plurality of sound channels of audio include first audio corresponding to the first viewing angle and second audio corresponding to the second viewing angle; and a first speaker speaks at a first moment, and the first speaker is located in the first viewing angle;

generating a target video recording file, where the target video recording file includes third audio and the first video picture, and the third audio includes at least a part of the first audio and at least a part of the second audio; and playing the third audio and the first video picture in response to a playback operation input by the user for the target video recording file, where when a picture corresponding to the first moment is played, an audio feature of the first audio in the third audio changes.

Embodiment 15: The method according to Embodiment 14 is provided, where the audio feature includes a volume, and the playing the target video recording file further includes:

increasing the volume of the first audio when a video picture corresponding to the first moment is played.

Embodiment 16: The method according to Embodiment 15 is provided, where when the video picture corresponding to the first moment is played, gradually increasing the volume of the first audio.

Embodiment 17: The method according to any one of Embodiments 14 to 16 is provided, where the electronic device includes a first microphone and a second microphone; and in the video recording mode, the first microphone records the first audio, and the second microphone records the second audio; or in the video recording mode, the first microphone records the second audio, and the second microphone records the first audio.

Embodiment 18: The method according to any one of Embodiments 14 to 16 is provided, where the electronic device includes a first microphone, and a second microphone is in a wireless connection with the electronic device; and in the video recording mode, the first microphone records the first audio, the second microphone records the second audio, and the second audio is sent to the electronic device through the wireless connection; or in the video recording mode, the first microphone records the second audio, the second microphone records the first audio, and the first audio is sent to the electronic device through the wireless connection.

Embodiment 19: The method according to any one of Embodiments 14 to 16 is provided, where both a first microphone and a second microphone are in a wireless connection with the electronic device, and the first audio and the second audio are sent to the electronic device through the wireless connection; and in the video recording mode, the first microphone records the first audio, and the second microphone records the second audio; or in the video recording mode, the first microphone records the second audio, and the second microphone records the first audio.

Embodiment 20: The method according to Embodiment 14 is provided, further including: buffering an audio frame of the first audio, an audio frame of the second audio, and a video frame of the first video picture in the video recording mode;

detecting an action of the first speaker; and adjusting an audio feature of the first audio in the third audio when it is detected that the first speaker starts to speak, and adjusting an audio feature of the second audio in the third audio starting from i audio frames before a current audio frame, where i is greater than or equal to 1.

Embodiment 21: The method according to Embodiment 14 is provided, where the first viewing angle and the second viewing angle are any two of a front-facing viewing angle, a wide-angle viewing angle, or a zoom viewing angle.

Embodiment 22: An electronic device, including:

a plurality of cameras, configured to acquire video pictures;

a screen, configured to display an interface;
an audio playback component, configured to play audio;
one or more processors;
a memory; and
one or more computer programs, stored in the memory, where the one or more computer programs include instructions, and the instructions, when executed by the electronic device, cause the electronic device to perform the audio processing method according to any one of Embodiments 1 to 21.

Embodiment 23: A computer-readable storage medium, including computer instructions, where the computer instructions, when running on an electronic device, cause the electronic device to perform the audio processing method according to any one of Embodiments 1 to 21.

Embodiment 24: A computer program product, where the computer program product, when running on a computer, causes the computer to perform the audio processing method according to any one of Embodiments 1 to 21.

Embodiment 25: An electronic device is provided, including a screen, a computer memory, and a camera, and configured to perform the audio processing method according to any one of embodiments 1 to 21.

All or some of the foregoing embodiments may be implemented by using software, hardware, firmware, or any combination thereof. When the software is used for implementation, implementation may be entirely or partially performed in the form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium, or transmitted by using the computer-readable storage medium. For example, the computer instructions may be transmitted from a website, a computer, a server, or a data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes: any medium that can store program code, such as a ROM, a random access memory RAM, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An audio processing method, the method comprising:
    entering, by an electronic device, a video recording mode in response to an input of a user, wherein the electronic device comprises a first camera and a second camera, wherein the first camera performs photographing from a first viewing angle, and the second camera performs photographing from a second viewing angle;
    in the video recording mode:
        recording, by the first camera, a first video picture from the first viewing angle, and recording, by the second camera, a second video picture from the second viewing angle, wherein the first video picture and the second video picture are recorded simultaneously; and
        simultaneously recording, by the electronic device, a plurality of sound channels of audio, wherein the plurality of sound channels of audio comprise first audio corresponding to the first viewing angle and second audio corresponding to the second viewing angle;
    generating, by the electronic device, a target video recording file, wherein the target video recording file comprises the plurality of sound channels of audio;
    detecting, by the electronic device, an action of a first speaker at a first moment, wherein the first speaker is located in the second viewing angle; and
    playing, by the electronic device, the target video recording file in response to a playback operation input by the user for the target video recording file, wherein when a picture corresponding to the first moment is being played, a volume of the second audio in the target video recording file is increased and a volume of the first audio in the target video recording file is decreased based on the detecting the action of the first speaker at the first moment.

2. The method according to claim 1, wherein in response to the video picture corresponding to the first moment being played, the volume of the second audio is gradually increased, and the volume of the first audio is gradually decreased.

3. The method according to claim 1, wherein:
    in the video recording mode, the electronic device displays a photographing interface, and the photographing interface comprises the first video picture and the second video picture;
    the target video recording file further comprises the second video picture; and
    during playback of the target video recording file, at least one of the first video picture or the second video picture is displayed.

4. The method according to claim 1, wherein:
    in the video recording mode, the electronic device displays a photographing interface, and the photographing interface does not comprise the second video picture; and
    during playback of the target video recording file, the second video picture is not displayed.

5. The method according to claim 1, wherein in the video recording mode, the second camera records the second video picture from the second viewing angle, and the first speaker in the second video picture opens a mouth at the first moment.

6. The method according to claim 1, wherein:
in the video recording mode, a second speaker speaks at a second moment, wherein the second speaker is within the first viewing angle; and
during playback of the target video recording file, when a picture corresponding to the second moment is being played, the volume of the first audio in the target video recording file is increased and the volume of the second audio in the target video recording file is decreased based on the second speaker speaking at the second moment.

7. The method according to claim 6, wherein in response to the picture corresponding to the second moment being played, the volume of the first audio in the target video recording file is gradually increased, and the volume of the second audio in the target video recording file is gradually decreased.

8. The method according to claim 1, wherein a second speaker speaks at a previous moment of the first moment, and the second speakers is within the first viewing angle.

9. The method according to claim 1,
wherein the electronic device comprises a first microphone and a second microphone; and
wherein:
in the video recording mode, the first microphone records the first audio, and the second microphone records the second audio; or
in the video recording mode, the first microphone records the second audio, and the second microphone records the first audio.

10. The method according to claim 1,
wherein the electronic device comprises a first microphone, and a second microphone is in a wireless connection with the electronic device; and
wherein:
in the video recording mode, the first microphone records the first audio, the second microphone records the second audio, and the second audio is sent to the electronic device through the wireless connection; or
in the video recording mode, the first microphone records the second audio, the second microphone records the first audio, and the first audio is sent to the electronic device through the wireless connection.

11. The method according to claim 1,
wherein both a first microphone and a second microphone are in a wireless connection with the electronic device, and the first audio and the second audio are sent to the electronic device through the wireless connection; and
wherein:
in the video recording mode, the first microphone records the first audio, and the second microphone records the second audio; or
in the video recording mode, the first microphone records the second audio, and the second microphone records the first audio.

12. The method according to claim 1, further comprising:
buffering an audio frame of the first audio, an audio frame of the second audio, and a video frame of the first video picture in the video recording mode; and
in response to the detecting the action of the first speaker at the first moment, adjusting an audio feature of the first audio in the third audio and adjusting an audio feature of the second audio in the third audio starting from i audio frames before a current audio frame, wherein i is greater than or equal to 1.

13. The method according to claim 1, wherein the first viewing angle and the second viewing angle are any two of a front-facing viewing angle, a wide-angle viewing angle, or a zoom viewing angle.

14. An electronic device, comprising:
a plurality of cameras, configured to acquire video pictures;
a screen, configured to display an interface;
an audio playback component, configured to play audio;
one or more processors; and
a memory, wherein one or more computer programs are stored in the memory, wherein the one or more computer programs comprise instructions, and the instructions, when executed by the one or more processors, cause the electronic device to perform the audio processing method according to claim 1.

15. An electronic device, comprising a screen, a computer memory, and a camera, wherein the electronic device is configured to perform the audio processing method according to claim 1.

16. An audio processing method, the method comprising:
entering, by an electronic device, a video recording mode in response to an input of the user, wherein the electronic device comprises a first camera and a second camera, wherein the first camera performs photographing from a first viewing angle, and the second camera performs photographing from a second viewing angle;
in the video recording mode:
recording, by the first camera, a first video picture from the first viewing angle, and recording, by the second camera, a second video picture from the second viewing angle, wherein the first video picture and the second video picture are recorded simultaneously; and
simultaneously recording, by the electronic device, a plurality of sound channels of audio, wherein the plurality of sound channels of audio comprise first audio corresponding to the first viewing angle and second audio corresponding to the second viewing angle;
generating, by the electronic device, a target video recording file, wherein the target video recording file comprises the plurality of sound channels of audio;
detecting, by the electronic device, an action of a first speaker at a first moment, wherein the first speaker is located in the first viewing angle; and
playing, by the electronic device, the target video recording file in response to a playback operation input by the user for the target video recording file, wherein when a picture corresponding to the first moment is being played, a volume of the second audio in the target video recording file is decreased and a volume of the first audio in the target video recording file is increased based on the detecting the action of the first speaker at the first moment.

17. The method according to claim 16, wherein the audio feature comprises a volume, and the playing the target video recording file comprises:
increasing the volume of the first audio in response to a video picture corresponding to the first moment being played.

18. The method according to claim 17, wherein in response to the video picture corresponding to the first moment being played, the volume of the first audio is gradually increased, and the volume of the second audio is gradually decreased.

* * * * *

UNITED STATES PATENT AND TRADEMARK OFFICE
CERTIFICATE OF CORRECTION

PATENT NO. : 11,870,941 B2
APPLICATION NO. : 17/740114
DATED : January 9, 2024
INVENTOR(S) : Daiting Chen It is certified that error appears in the above-identified patent and that said Letters Patent is hereby corrected as shown below:

On the Title Page

Applicant (71): "Honor Device Co., Ltd., Guangdong (CN)" should read -- Honor Device Co., Ltd., Shenzhen (CN) --.

Signed and Sealed this
Twentieth Day of February, 2024

Katherine Kelly Vidal
*Director of the United States Patent and Trademark Office*